United States Patent [19]

Draper et al.

[11] Patent Number: 4,640,233

[45] Date of Patent: Feb. 3, 1987

[54] MODEL STEAM GENERATOR

[75] Inventors: Robert Draper, Churchill Boro; Edward H. Smith, Brave, both of Pa.

[73] Assignee: Westinghouse Electric Corp., Pittsburgh, Pa.

[21] Appl. No.: 636,437

[22] Filed: Jul. 31, 1984

[51] Int. Cl.⁴ .................................. F22B 37/26
[52] U.S. Cl. ..................... 122/488; 55/186; 73/61.2; 73/865.6; 122/1 C; 122/4 A; 122/392; 122/406 R; 122/444; 219/275; 219/321; 376/245; 376/371
[58] Field of Search ............. 122/1 R, 1 C, 4 A, 6 R, 122/360, 361, 389, 392, 400, 406 R, 406 S, 412, 444, 458, 488, 489; 55/185–188; 376/316, 371, 245 X; 219/275, 320, 321, 306; 73/61.2, 432 SD

[56] References Cited

U.S. PATENT DOCUMENTS

| | | | |
|---|---|---|---|
| 1,907,166 | 5/1933 | Williams | 55/186 |
| 2,987,830 | 6/1961 | Jackson . | |
| 3,688,083 | 8/1972 | Rice et al. | 219/275 |
| 3,853,702 | 12/1974 | Bevilacqua | 176/87 |
| 3,954,087 | 5/1976 | Stevens et al. | 122/406 S |
| 4,132,115 | 1/1979 | Benemann | 73/349 |
| 4,230,527 | 10/1980 | Cella | 376/371 |
| 4,261,298 | 4/1981 | McDonald et al. | 122/488 |
| 4,282,181 | 8/1981 | Pierce | 422/53 |
| 4,288,290 | 9/1981 | Saima et al. | 176/19 R |
| 4,322,233 | 3/1982 | Sisk | 376/371 |
| 4,328,013 | 5/1982 | Godare et al. | 55/185 |
| 4,347,429 | 8/1982 | Will | 219/275 |
| 4,377,737 | 3/1983 | Berry | 219/275 |
| 4,452,753 | 6/1984 | Wentzell et al. | 376/249 |
| 4,459,465 | 7/1984 | Knight | 219/321 |

FOREIGN PATENT DOCUMENTS 8320236 12/1983 France .

OTHER PUBLICATIONS

"Surrogate Boiler Design and Cost Consideration", EPRI N P 2967, Mar. 1983, pp. 4-1-4-4.

Primary Examiner—Albert J. Makay
Assistant Examiner—Steven E. Warner
Attorney, Agent, or Firm—L. A. DePaul

[57] ABSTRACT

An improved model steam generator for simulating the conditions within a nuclear steam generator in order to monitor the condition of the heat exchange tubes and tubesheet of the nuclear steam generator is disclosed herein. The improved model steam generator includes a highly effective separator assembly for separating water droplets entrained within the steam flowing out of the outlet of the secondary side of the generator formed from a plurality of separator grids, each of which includes an array of semi-cylindrical deflector members. The grids are vertically stacked with the deflector members transversely disposed to the flow of steam generated by the model steam generator. Each of the parallel arrays of deflector members in each grid is angularly disposed approximately 45° to the deflector members in the grids above it and below in order to provide a tortuous path for the flow of steam ascending therethrough. The separator assembly removes proportionately more water droplets from the steam generated by the model steam generator, which in turn allows it to accurately simulate the sludge accumulation characteristics of the nuclear steam generator being monitored. The model steam generator also includes a bankable condenser assembly which greatly enhances its turndown ratio, as well as a feedwater pre-heater which allows it to accurately simulate the thermohydraulic conditions at a variety of points on the tubesheet of the nuclear steam generator.

24 Claims, 25 Drawing Figures

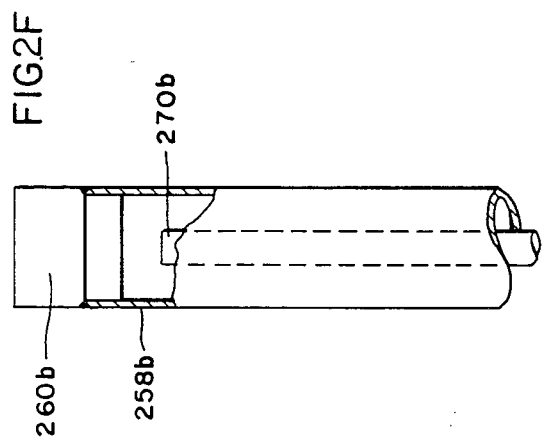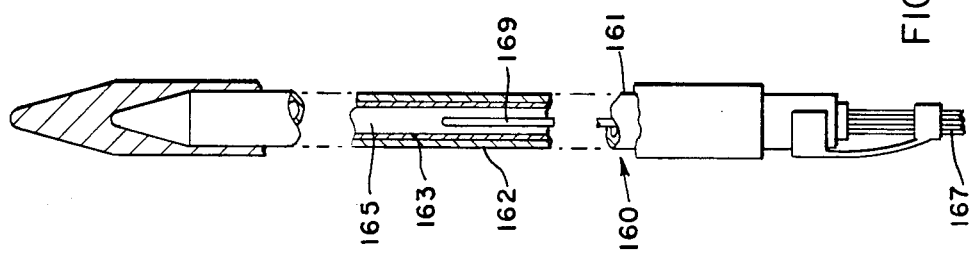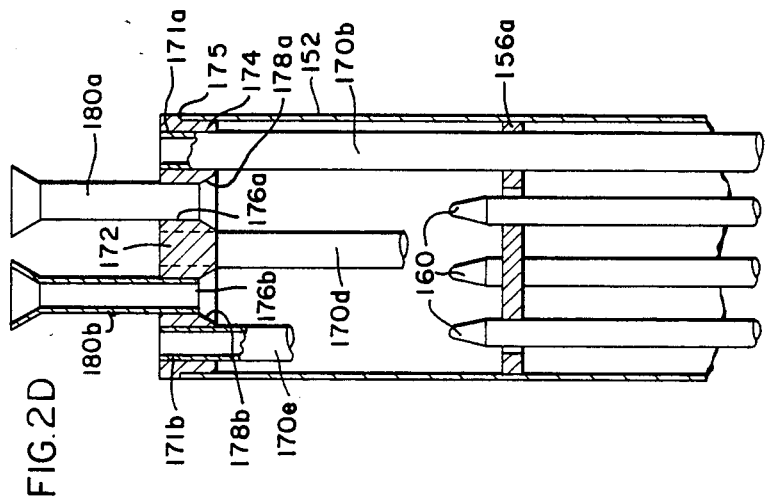

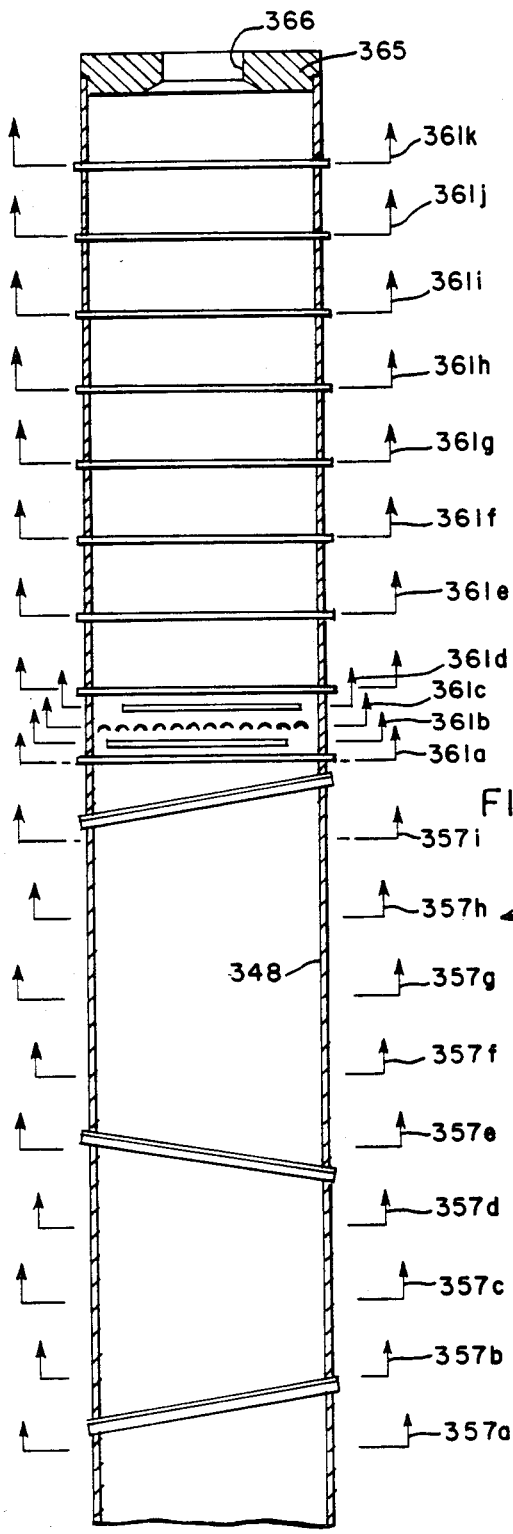
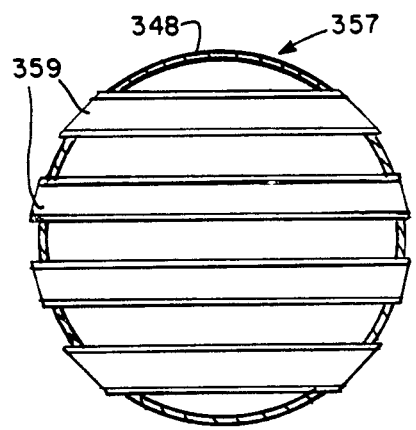
FIG.2I.
FIG.2H.
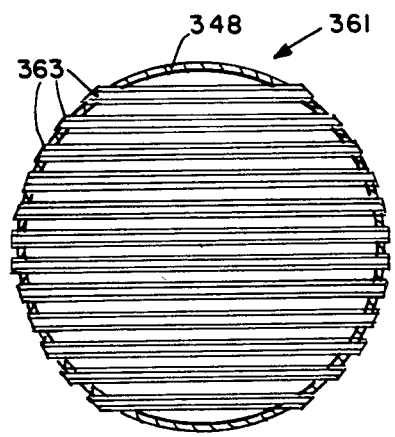
FIG.2J.

MODEL STEAM GENERATOR

BACKGROUND OF THE INVENTION

1. Field of the Invention

This invention relates to model steam generators of the type used to monitor the corrosion of the heat exchange tubes in nuclear steam generators.

2. Description of the Prior Art

Model steam generators for monitoring the amount of corrosion degradation occurring within the heat exchange tubes of a nuclear steam generator are known in the prior art. Generally speaking, such model generators operate by subjecting an array of sample heat exchange tubes to the same heat, pressure and chemical conditions which surround the heat exchange tubes in nuclear steam generators. If these conditions are accurately simulated, the amount of corrosion which occurs in the sample tubes of the model steam generator will provide an accurate indication of the tube corrosion present in the nuclear steam generator being monitored. Such model steam generators are a particularly useful form of corrosion monitor, because they obviate the need for shutting down the nuclear plant and sending technicians into the radioactive interiors of the generators. However, such model steam generators are useful only insofar as they are capable of accurately simulating the heat, pressure and chemical conditions which exist inside the nuclear plant. Any material departures from these conditions will adversely affect the accuracy of the model steam generator.

In order to understand the difficulties in building a practical model steam generator which provides an accurate monitor for heat exchange tube corrosion, one must first understand how nuclear steam generators are generally constructed, and what chemical and hydraulic conditions are responsible for tube corrosion.

Nuclear steam generators are comprised of three principal parts, including a secondary side and a tubesheet, as well as a primary side which circulates water heated from a nuclear reactor. The secondary side of the generator includes a plurality of U-shaped tubes, as well as an inlet for admitting a flow of feedwater. The inlet and outlet ends of the U-shaped tubes within the secondary side are mounted in the tubesheet which hydraulically separates the primary side of the generator from the secondary side. The primary side in turn includes a divider sheet which hydraulically isolates the inlet ends of the U-shaped tubes from the outlet ends. Hot water flowing from the nuclear reactor is admitted into the section of the primary side containing all of the inlet ends of the U-shaped tubes. This hot water flows through these inlets, up through the tubesheet, and circulates around the U-shaped tubes which extend within the secondary side of the steam generator. The heated water transfers its heat through the walls of the U-shaped tubes to the feedwater flowing through the secondary side of the generator, thereby converting the feedwater to steam. After the nuclear-heated water circulates through the U-shaped tubes, it flows back through the tubesheet, through the outlets of the U-shaped tubes, and into the outlet section of the primary side, where it is recirculated back to the nuclear reactor. The inlet ends of the U-shaped tubes are known as the "hot legs", and the outlet ends of these tubes are known as the "cold legs".

The heat exchange tubes of such nuclear steam generators can suffer a number of different types of corrosion degradation, including denting, stress corrosion cracking, intragranullar attack, and pitting. In situ examination of the tubes within these generators has revealed that most of this corrosion degradation occurs in what are known as the crevice regions of the generator. Such crevice regions include the annular space between the heat exchange tubes and the tubesheet, as well as the annular clearance between these tubes and the various support plates in the secondary side which are used to uniformly space and align these tubes. Corrosive sludge tends to collect within these crevices from the effects of gravity. Moreover, the relatively poor hydraulic circulation of the water in these regions tends to maintain the sludge in these crevices, and to create localized "hot spots" in the tubes adjacent the sludge. The heat radiating from these "hot spots" acts as a powerful catalyst in causing the exterior surface of the heat exchange tubes to chemically combine with the corrosive chemicals in the sludge. While most nuclear steam generators include blow-down systems for periodically sweeping the sludge out of the generator vessel, the sludges in the crevice regions are not easily swept away by the hydraulic currents induced by such systems. Despite the fact that the heat exchange tubes of such nuclear generators are typically formed from corrosion-resistant Inconel stainless steel, the combination of the localized regions of heat and corrosive sludges can ultimately cause the heat exchange tubes to crack, and leak radioactive water from the primary side into the secondary side of the generator. However, this need not occur if the heat exchange tubes are provided with internally reinforcing sleeves before the corrosion causes cracks in the tube walls.

Model steam generators were developed in order to accurately monitor the amount of corrosion degradation occurring in the heat exchange tubes of a particular nuclear steam generator, in order that these tubes might be sleeved before any of the tube walls crack. Such model steam generators have been found to be a particularly accurate way of ascertaining the amount of corrosion degradation occurring in the heat exchange tubes of a nuclear steam generator, because the particular amount of corrosion which the feedwater chemistry and thermohydraulics of the particular generator will induce in a particular set of tubes is virtually impossible to predict by purely theoretical models.

However, such prior art model steam generators are not without significant problems. For example, some of these model steam generators have no means for separating the water out of the wet steam they generate out of their secondary sides. This allows a significant amount of sludge-generating chemicals to escape through water droplets which are entrained within this steam, thereby impairing the ability of the model to accurately simulate the amount of sludge which accumulates in the steam generator. In order to correct this inaccuracy, some model steam generators use scaled-down versions of the swirl-vane type water separators used in full-scale generators.

Such swirl-vane separators operate by rotating a metallic plate through the column of steam generated by the secondary side of the model steam generators. The plate impinges many of the water droplets entrained in this column of steam and slings them against the inner walls of the secondary side of the generator, where they stream back down into the feedwater reservoir in the secondary side. While scaled-down versions of this swirl-vane type separator are effective in removing most of the entrained water droplets in the steam produced in the secondary side of the model generator, the effective separation rate is still much higher than the one quarter of one percent loss rate provided by the swirl-vane type separators in the nuclear steam generators being simulated. Since the scaled-down versions of the swirl-vane type separators are not as proportionally effective at removing entrained water droplets in the steam produced in the secondary side of the model steam generators, these model steam generators have relatively greater water losses through their steam output conduits. These water losses again result in a significant amount of sludge-forming chemicals being injected out of the steam outlet of the secondary side, which again retards sludge formation in the model generator. The retardation of sludge formation throws off the accuracy of the simulation in a particularly dangerous way. The operator of the model steam generator could receive the erroneous impression that the nuclear steam generator being monitored is accumulating less tube-corroding sludge in the vicinity of the tubesheet than it actually is accumulating.

Still other deficiencies in prior art model steam generators include their inability to accurately simulate the condition of the heat exchange tubes and tubesheet in diverse areas of the steam generator. More precisely, many prior art model steam generators are incapable of simulating the circulation and heat flux at various points along the radius of the tubesheet of the nuclear steam generator being monitored. Additionally, many of these prior art generators are incapable of easily simulating both "low flux" and "high flux" conditions which exist in nuclear steam generators from their lowest to their highest steam outputs.

Clearly, a need exists for a model steam generator having a steam separator capable of reducing the water losses through the steam outlet pipe of the secondary side of the generator to a rate commensurate with the water losses which actually occur in the nuclear steam generator being monitored in order to accurately simulate the sludge accumulations which occur in the vicinity of the tubesheet of the generator. Ideally, such a model steam generator should also be capable of accurately and easily simulating the thermohydraulic conditions at any desired point along the radius of the tubesheet of the nuclear steam generator. Finally, such a model generator should have the capacity for simulating the conditions surrounding both the "hot legs" and "cold legs" of the heat exchange tubes over a broad turn-down range.

SUMMARY OF THE INVENTION

In its broadest sense, the invention is a model steam generator having an improved separator assembly for removing water droplets entrained within the flow of steam generated by the secondary side of the model generator. The model generator may further include a condenser assembly having first and second sets of condenser tubes for converting the flow of steam generated by the secondary side of the model steam generator back into a liquid condensate. In order to increase the turn-down ratio of the model steam generator, a banking valve is provided for selectively disconnecting one of the condenser tube sets of the condenser assembly. The broad turn-down ratio afforded by the banking valve allows the model steam generator to accurately simulate the thermohydraulic conditions within a nuclear steam generator over a broad range of operating loads. Finally, the invention may include a feedwater pre-heater for pre-heating the feedwater introduced into the secondary side of the generator to a selected temperature, in order that the varying thermal conditions associated with various regions of the tubesheet of the nuclear steam generator being monitored may be accurately simulated. The pre-heater is powered by an array of electrical resistance cartridge heaters which are double-walled in order to prevent contamination of the secondary side of the model steam generator in the event that one of the walls of the heater ruptures.

The separator assembly may include a plurality of separator grids, each of which is formed from a parallel array of deflector members. Each of these deflector members is preferably an elongated, semi-cylindrical member having its concave face disposed toward the flow of steam ascending through the secondary side of the model steam generator. The grids may be arranged into an upstream stack near the steam outlet, and a downwstream stack which faces the sample tubes. Each of the deflector members of the grids in the downstream stack may be inclined to the horizontal in order that the water droplets impinging these deflector members may drain back down into the water inventory at the bottom of the secondary side of the model steam generator. Additionally, the deflector members of each of the grids in both the upstream and downstream stacks may be angularly disposed relative to the deflector members of its neighboring grids in order to provide a tortuous path for the flow of steam ascending through the condenser assembly. In the preferred embodiment, each of the deflector members is angularly disposed 45° relative to the deflector members of the grids above it and below it.

BRIEF DESCRIPTION OF THE SEVERAL FIGURES

FIGS. 1A, 1B and 1C form a schematic diagram of the improved model steam generator of the invention;

FIG. 2C is a partial cross-sectional side view of one of the cartridge heaters used in the heater assembly of the primary side of the model steam generator;

FIG. 2D is a cross-sectional side view of the upper portion of the primary side of the boiler assembly;

FIG. 2F is a partial cross-sectional side view of one of the sample tubes disposed in both the tubesheet and secondary side of the boiler, showing both the riser tube disposed within the sample tube, as well as the end plug which closes this tube;

FIG. 2H is a cross-sectional side view of the separator assembly in the riser barrel of the secondary side;

FIG. 2I is a plan, bottom view of one of the large droplet separator grids used in the separator assembly of the invention;

FIG. 2J is a plan, bottom view of one of the small droplet separator grids used in the separator assembly of the invention;

DETAILED DESCRIPTION OF THE PREFERRED EMBODIMENT

Figure 1A:
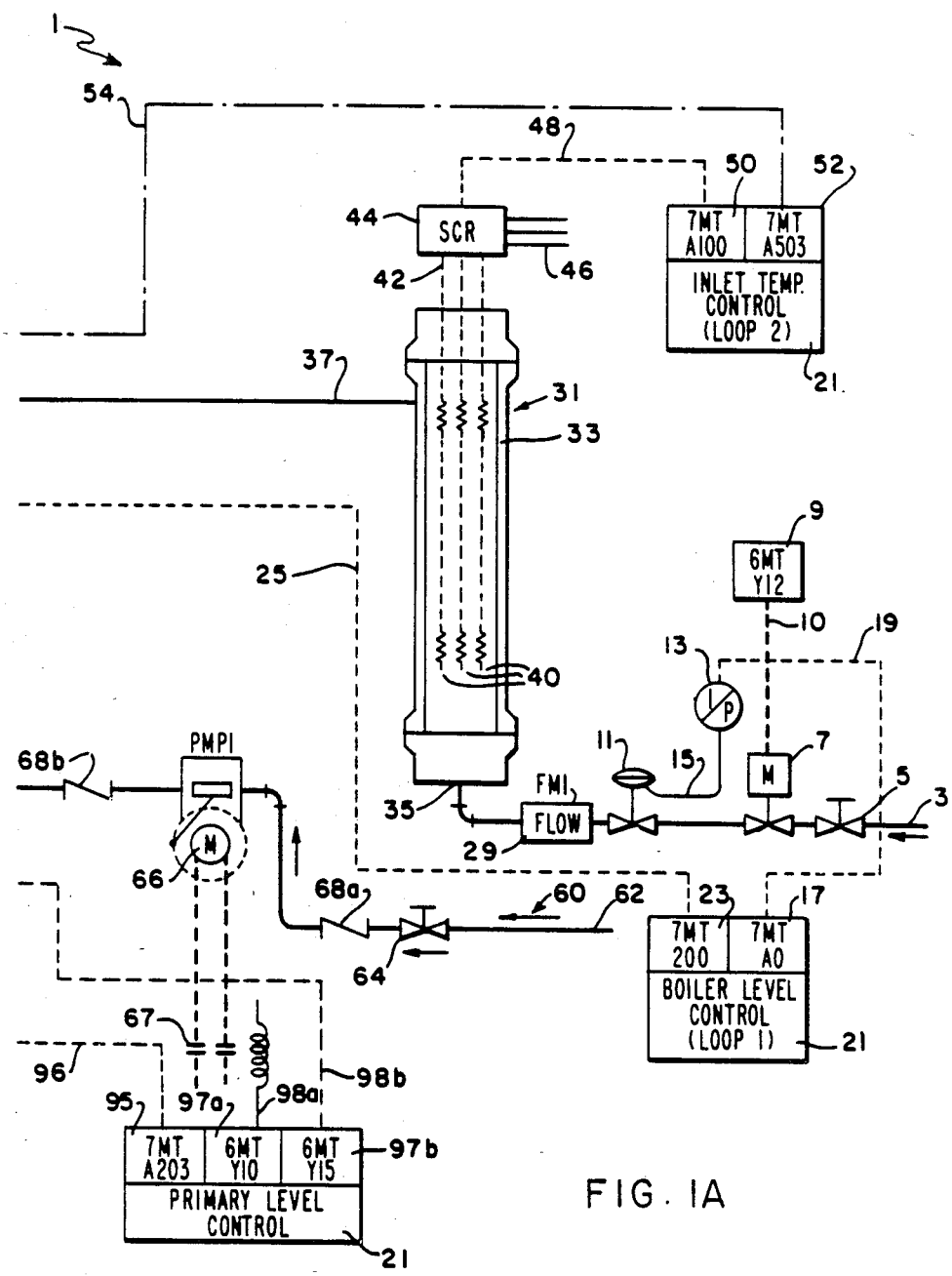
Figure 1B:
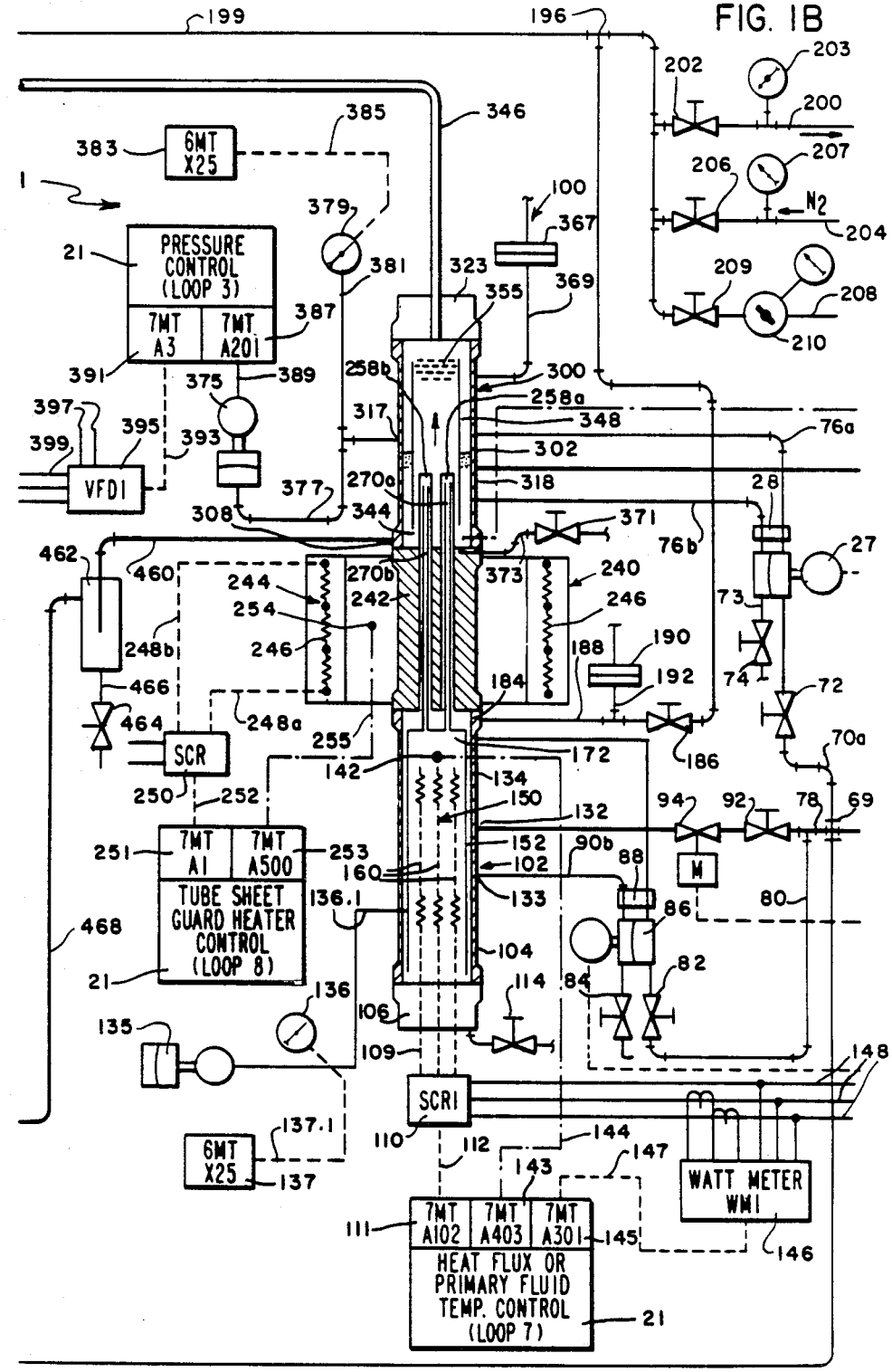
Figure 1C:
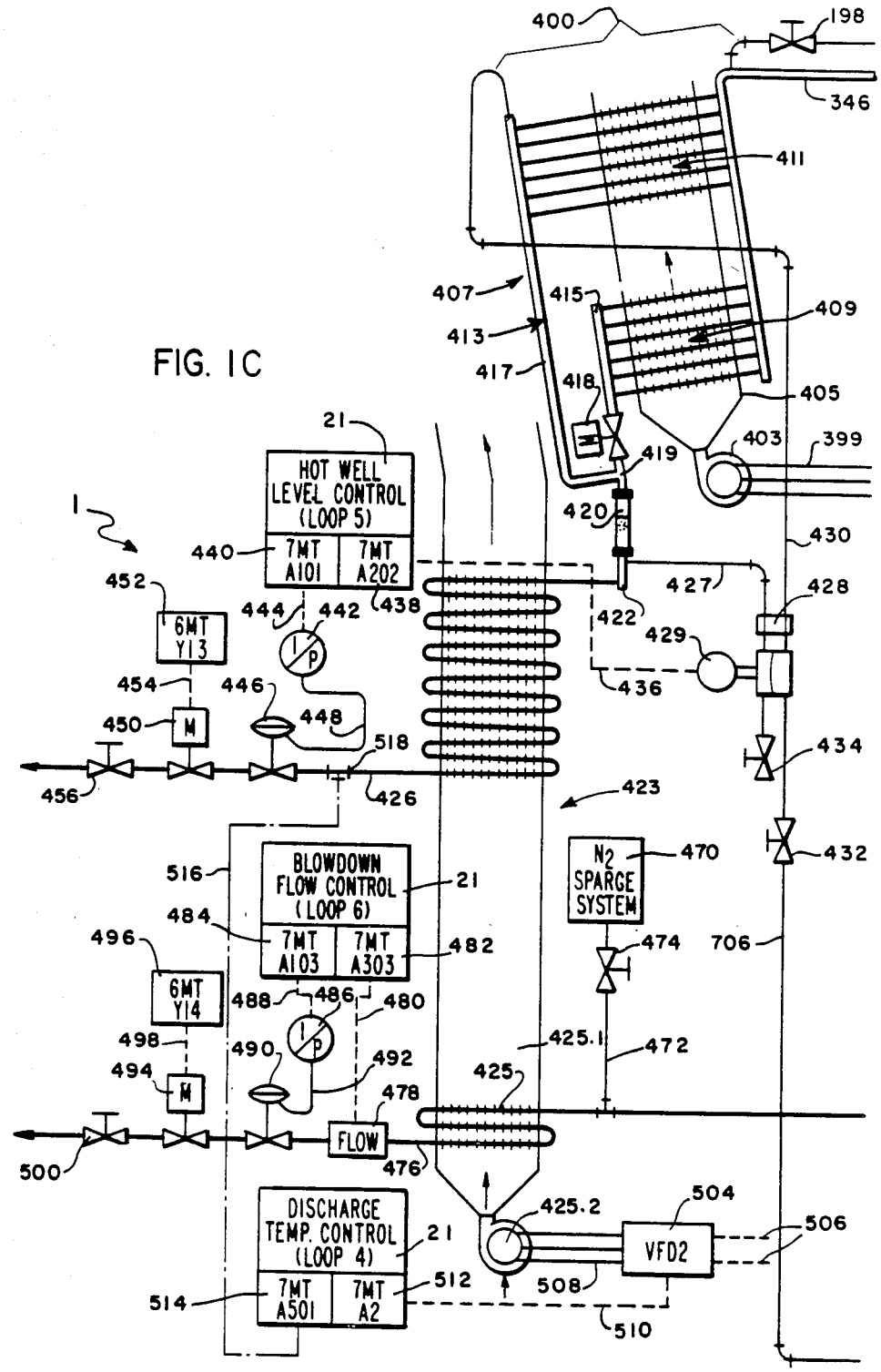
Figure 5A:
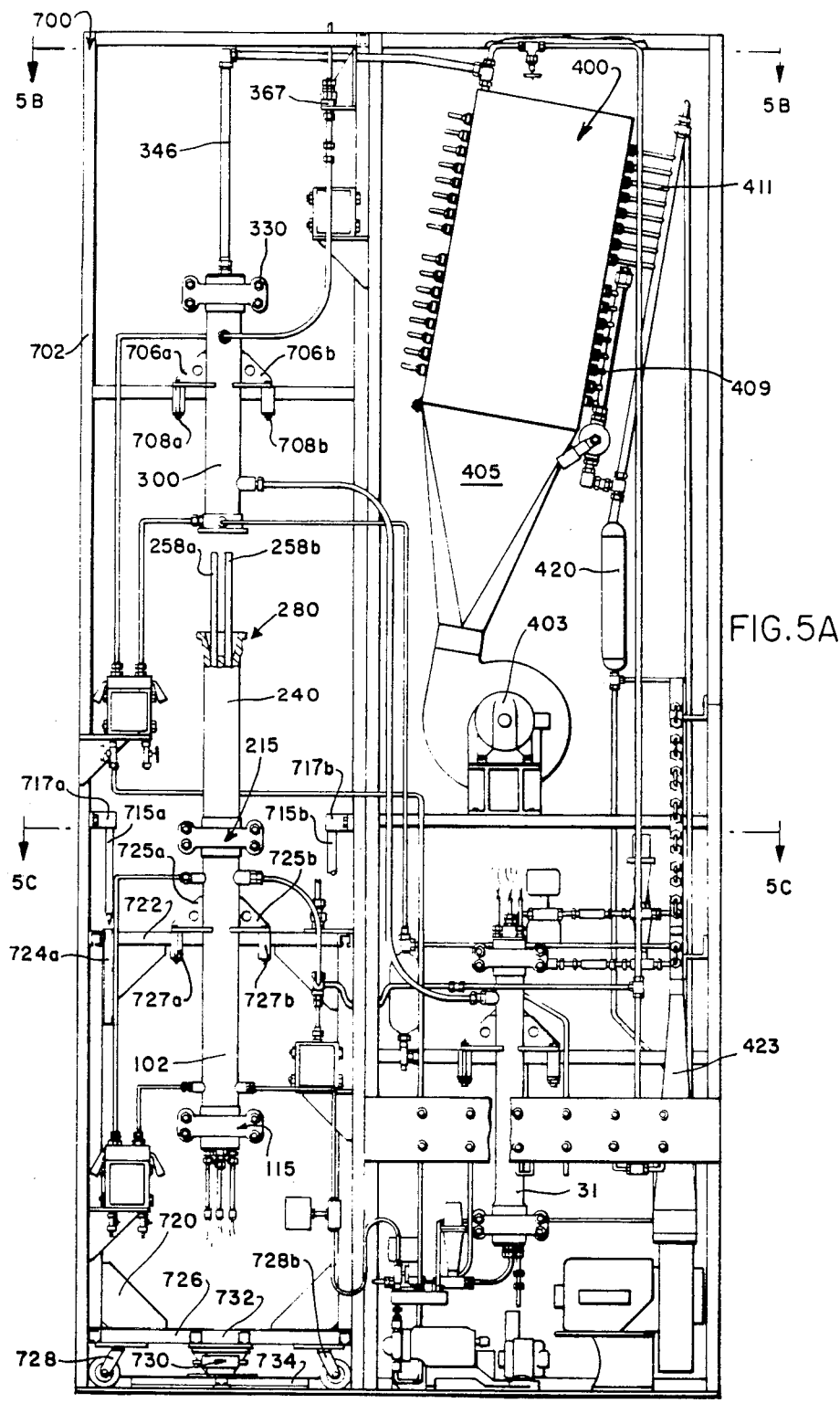
FIG. 5A is a side view of the mechanical arrangement of the improved model steam generator illustrating how the various components of the generator are mounted within a frame.
Figure 5B:
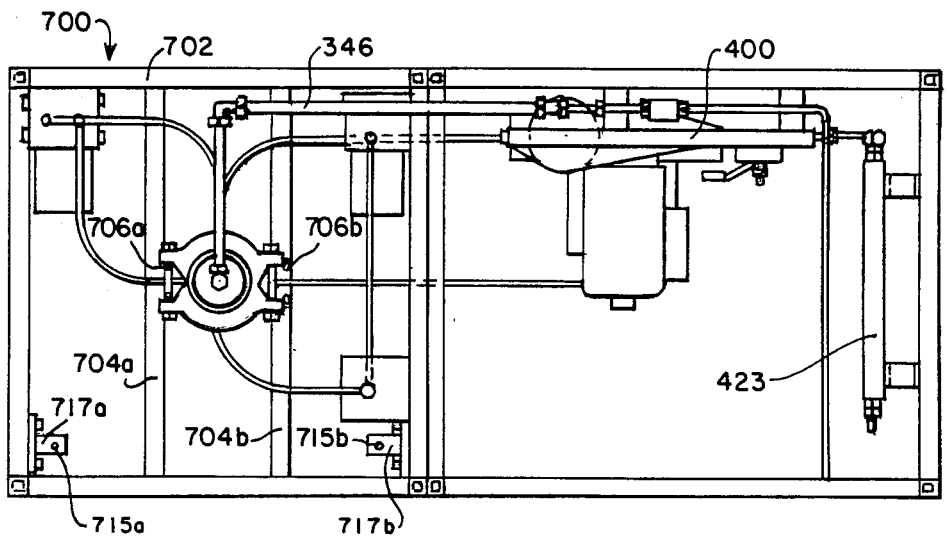
FIG. 5B is a top, plan view of the mechanical configuration of the generator taken along line 5B—5B of FIG. 5A.
Figure 5C:
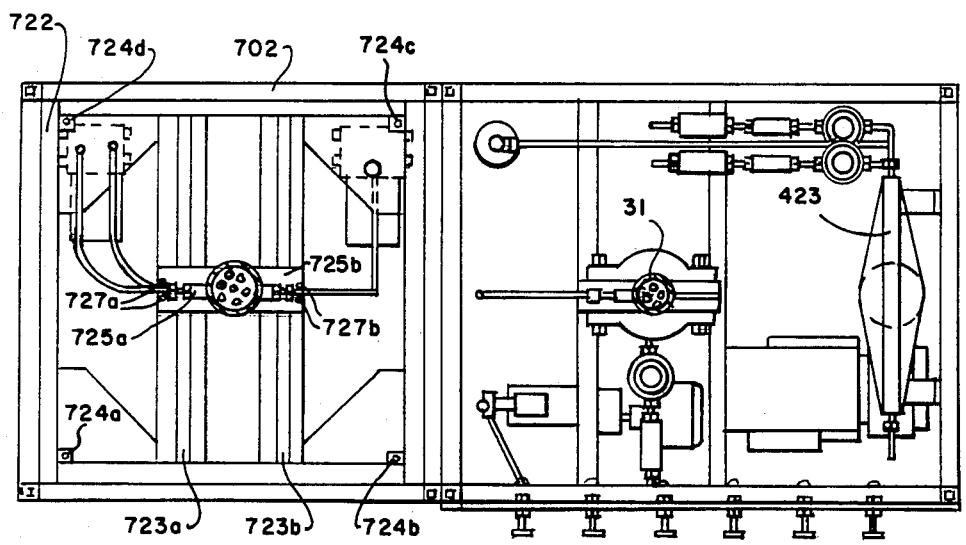
FIG. 5C is a top, plan view of the mechanical configuration of the generator taken along line 5C—5C of FIG. 5A.

General Description of the Structure and Operation of the Preferred Embodiment With reference to FIGS. 1A, 1B and 1C, wherein like numerals designate like components throughout all of the Figures, the model steam generator 1 of the invention generally comprises a feedwater inlet conduit 3, a makeup water supply 60, a boiler assembly 100 including a primary side 102, a tubesheet 240 and a secondary side 300, a condenser assembly 400, and a sub-cooler assembly 423. The feedwater inlet conduit 3 is connected to the feedwater system 600 illustrated in FIGS. 3A through 3D. As is illustrated in FIGS. 5A through 5C and in FIGS. 6A through 6D, all of the principal components are physically arranged within a frame assembly 700 including a cart 720 for conveniently moving the tubesheet 240 and primary side 102 away from the primary side 300 of the boiler vessel 100 during the tube inspection procedure.

The feedwater inlet conduit 3 includes a pre-heater 31 for supplying pre-heated feedwater into the secondary side 300 of the boiler vessel 100 of the invention, hereinafter referred to as boiler assembly 100. As will be discussed in more detail hereinafter, the provision of the pre-heater 31 allows the model steam generator 1 to simulate the thermohydraulic conditions existing at a variety of radial points along the tubesheet of the nuclear generator being monitored. The makeup water supply system 60 supplies makeup water to a heater assembly 150 enclosed within the primary side 102 of the boiler assembly 100. Heat is transferred between the primary side 102 and the secondary side 300 of the boiler 100 by means of four sample heat exchange tubes 258a, 258b, 258c and 258d. These sample tubes are mounted within the tubesheet 240 which hydraulically isolates the primary side 102 from the secondary side 300 of the boiler assembly 100. These four sample heat exchange tubes 258a through 258d are of the same diameter, wall thickness and material as the heat exchange tubes used in the nuclear steam generator being monitored. The annular spacing between the tubesheet 240 and the sample tubes 258a, 258b, 258c and 258d is preferably equivalent to the annular spacing of the heat exchange tubes within the tubesheet of the nuclear steam generator in order to accurately simulate the corrosion-producing "crevice boiling" which typically occurs in these regions.

Heat is transferred through the sample tubes by means of a boiling-condensing thermosyphon mechanism. In this mechanism, water in the primary side 102 is converted into a flow of steam by means of the heater assembly 150. This flow of steam is directed into the open ends of the sample tubes 258a, 258b, 258c and 258d. This steam transfers heat to the feedwater in the secondary side and runs down the inner walls of the sample tubes 258a, 258b, 258c and 258d where it eventually flows back into the water inventory in the primary side 102. In order to duplicate the substantially uniform heat flux pattern which circumscribes of the heat exchange tubes in the nuclear steam generator being monitored, the heater assembly 150 includes riser tubes 270a, 270b, 270c and 270d which are concentrically disposed within each of the sample tubes 258a, 258b, 258c and 258d, respectively. As will be described in more detail hereinafter, these riser tubes prevent heat-blocking Helmhotz instabilities, or ripples, from forming in the film of condensate which flows down the inner walls of the sample tubes. Such ripples can cause non-uniformities to occur in the heat flux pattern surrounding the sample heat exchange tubes, thereby introducing inaccuracies in the simulation. These riser tubes 270a, 270b, 270c and 270d also facilitate the circulation in the thermosyphon mechanism by providing a flow of pressurized steam down the inner walls of the sample tubes which assists gravity by pulling the flow of condensate back toward the water inventory in the primary side 102 of the boiler assembly 100.

The heat transferred by the sample tubes 258a, 258b, 258c and 258d causes the feedwater in the secondary side 300 to boil and turn to steam. In order to accurately simulate the conditions within a nuclear steam generator, the water droplets entrained in this column of steam must be captured and recirculated back into the secondary side. Failure to capture and recirculate these entrained water droplets will result in an increased demand for blow-down, which in turn will dilute the concentration of sludge-forming chemicals within the feedwater in the secondary side 300. The dilution of these sludge-producing chemicals produces inaccuracies in the relative amounts of sludge accumulated between the model and the actual steam generators. Accordingly, the secondary side 300 includes a separator assembly 355 formed from a plurality of separator grids, each of which includes an array of mutually parallel deflector members. As will be seen hereinafter, these deflector members form a far more effective water separator than would a scale-down of the "swirl-vane" type of separator devices used in nuclear steam generators, and advantageously allows the model steam generator to operate both in real-time and predictive modes.

On the outlet side of the boiler assembly 100, the model steam generator 1 includes the condensor assembly 400. The condensor assembly 400 includes both primary and secondary condensor tube sets 409 and 411.

A motor-operated banking valve 418 allows the primary set of condenser tubes 409 to be selectively shut down in order to increase the effective turn-down ratio of the condenser assembly 400. The condenser assembly 400 and the blow-down outlet system 458 are both thermally coupled to a sub-cooler assembly 423. Specifically, the outlet conduit 419 of the condenser assembly 400 is fluidly connected to a condensate sub-cooler coil 424, while the outlet conduit 468 from the blow-down settling tank 462 is fluidly connected to the blow-down sub-cooler coil 425 of the sub-cooler assembly 423. The sub-cooler assembly 423 lowers the temperature of both the condensate produced by the condenser assembly 400, and the liquid water running out of the blow-down outlet system 458 to a temperature of less than 200° F., in order to avoid flashing when the condensate and the blow-down water are drained out of the pneumatically-controlled valves 446 and 490, respectively.

Figure 2A:
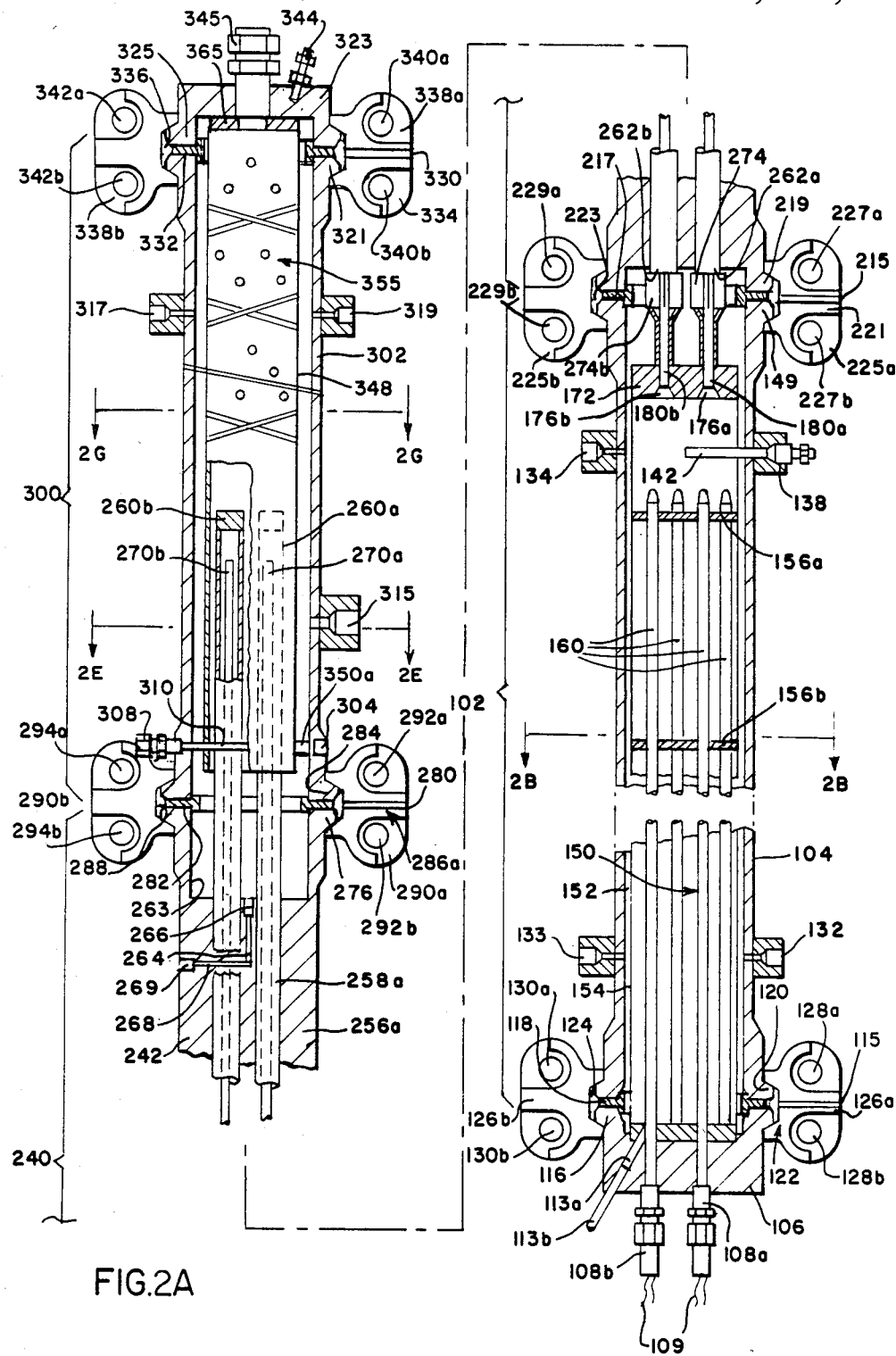
FIG. 2A is a cross-sectional side view of the boiler assembly of the invention.
Figure 2G:
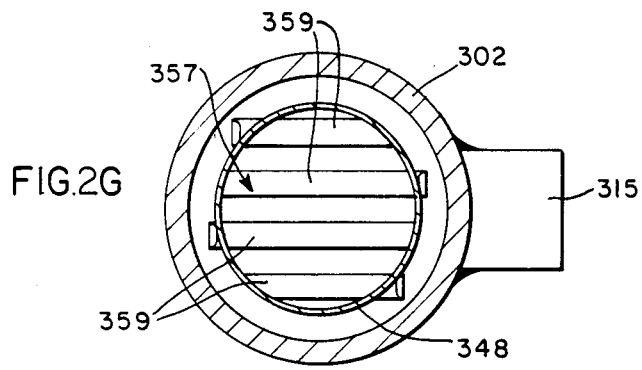
FIG. 2G is a plan, cross-sectional view of the secondary side of the boiler assembly, taken along line 2G—2G of FIG. 2A.

The primary side 102, tubesheet 240 and secondary side 300 forming the boiler assembly 100 are all detachably connected by means of Grayloc ®-type clamping assemblies 215 and 280, as illustrated in FIG. 2A. These clamping assemblies 215, 280 allow the sample tubes to be easily inspected when a particular test is concluded.

Finally, as illustrated in FIGS. 5A through 5C and in FIGS. 5A through 6D, the invention includes a main frame 702 for suspending the secondary side 300, and a cart 720. The cart 720 includes a screw jack 730 for moving the primary side 103 and the tubesheet 240 both laterally and vertically relative to the suspended secondary side 300 to further facilitate tube inspections.

Specific Description of the Preferred Embodiment

With specific reference now to FIGS. 1A and 1B, feedwater destined for the secondary side 300 of the boiler assembly 100 enters inlet conduit 3 under pressure from the feedwater inlet system 600. In most instances, the feedwater entering the inlet conduit 3 will be the same feedwater used in the nuclear steam generator being monitored in order to insure that there are no differences in the chemistry of the water used in the two systems. However, as will be described in more detail hereinafter, the feedwater used in the model steam generator 1 may also be feedwater from the nuclear system generator which has been specially treated with anti-corrosive additives in order to evaluate the efficacy of the additives in retarding corrosion in the heat exchange tubes 258a, 158b, 258c and 258d in the boiler assembly 100. Alternatively, demineralized, deaerated water which has been chemically treated may be introduced into the inlet conduit 3 in order to test the effectiveness of anti-corrosive additives other than those in current use in the nuclear steam generator. While not shown in any of the several figures, the feedwater inlet conduit 3 may include a feedwater booster pump 26.1 for insuring that an adequate flow of feedwater reaches the secondary side 300 of the boiler assembly 100.

Inlet conduit 3 includes both manual and motorized feedwater shutoff valves 5 and 7 for completely isolating the model steam generator 1 from the feedwater source. Motorized valve 7 is a rotating ball-type valve having positive shutoff characteristics. While many types of commercially available valves may be used in the generator 1, motorized valve 7 (and all other motorized valves in the system as well) is preferably a Model SS-790 valve manufactured by Clayton-Mark Pacific Corporation of Evanston, Ill. Manual shutoff valve 5 (and all of the other manual shutoff valves of the generator 1) may be any one of a number of commercially available globe-type valves. Of the two shutoff valves 7 and 5, motorized valve 7 is the preferred valve for isolating the model steam generator 1 from the feedwater source, while the manually operated shutoff valve 5 is intended as a backup for the motorized valve in the event of a malfunction of either the central processing unit 21, or the electric motor in the valve 7. Motorized valve 7 is remotely controlled by means of an output module 9 connected to a central processing unit 21. In the preferred embodiment, the central processing unit is a PM 550 microprocessor-based control system manufactured by Texas Instruments, Inc. of Dallas, Tex.

The primary regulator of the flow rate of feedwater into the secondary side 300 of the boiler assembly 100 is not the shutoff valves 5 or 7, but rather the pneumatically controlled needle valve 11 which is located upstream of the shutoff valves 5 and 7. The pneumatic control mechanism of needle valve 11 is connected to a source of compressed air (not shown) by way of an air line 15. The amount of compressed air admitted into the pneumatic mechanism of the valve 11 is regulated by a current-to-pressure transducer 13. This transducer 13 is electrically connected to an output module 17 of the central processing unit 21 by way of an electric cable 19. The amount of current that the output control module 17 transmits to the current-to-pressure transducer 13 is dependent upon an electric signal transmitted by an input module 23. This module 23 is in turn electrically connected to a liquid level sensor 27 by way of an electric cable 25.

Generally speaking, liquid level sensor 27 is in fact a differential pressure sensor of the type which includes a resilient diaphragm upon which a strain gauge bridge is chemically printed. Differences in the level of water in the primary side 300 of the boiler assembly 100 flexes the diaphragm in the level sensor 27 either inwardly or outwardly, which in turn varies the control current flowing through the electric cable 25. The central processing unit 21 is programmed to maintain the level of the water in the secondary side 300 between certain limits, and modulates the pneumatically controlled needle valve 11 through output module 17 in accordance with the fluctuations in the current of the control signal which it senses through input module 23. In the preferred embodiment, the level sensor 27 (and all of the differential pressure sensors of the steam generator 1) includes a manifold valve 28. The manifold valve 28 allows the operator of the model steam generator 1 to isolate the liquid level sensor 27 from the pressure sensing lines 76a, 76b if and when it becomes desirable to service or replace the sensor 27, thereby obviating the need for a general system shut-down. The liquid level sensor (and all of the differential pressure sensors of the steam generator 1) is a Model No. 115DP-3-E-M1 sensor manufactured by Rosemont, Inc., of Minneapolis, Minn.

A flowmeter 29 is located in inlet conduit 3 upstream of the pneumatically operated regulating valve 11. The purpose of the flowmeter 29 is to provide a means of monitoring the feedwater flow into the secondary side 300 of the boiler assembly 100. Flowmeter 29 is preferably a Model FMI thermal flowmeter manufactured by the Thermal Instrument Corporation of Trevose, Pa. The output of flowmeter 29 is visually displayed on a control panel (not shown) separate from the frame assembly 700 which holds together all of the mechanical components of the model steam generator 1.

The water flowing through the flowmeter 29 is heated by an electrically-powered pre-heater 31 before it enters the secondary side 300 of the boiler assembly through conduit 58. The general purpose of the pre-heater 31 is to accurately simulate the thermal condition of the feedwater in a selected portion of the nuclear steam generator being monitored. This function will become clear if one considers the thermal conditions of the feedwater surrounding different sections of the tubesheet of an actual nuclear steam generator. In nuclear steam generators, the feedwater arrives in a relatively cool state through the tube wrapper of the secondary side, and becomes progressively hotter as it flows toward the center of the array of U-shaped heat exchange tubes extending out of the tubesheet of the generator. Hence, the thermal flux of the feedwater depends in part on its particular radial position with respect to the tubesheet of the boiler. This heat flux is further dependent on whether the feedwater is passing over either the "hot legs" of the heat exchange tubes (i.e., those legs in which the nuclear-heated water enters the secondary side of the boiler), or the "cold legs" of these tubes (through which the nuclear-heated water leaves the secondary side of the boiler). Accordingly, if the thermal conditions surrounding a particular section of the tubesheet of the nuclear generator are to be accurately simulated, the ambient temperature of the feedwater in this section must be duplicated. Heat is a catalyst to the corrosive processes surrounding the heat exchange tubes, and any inaccuracies in the temperature of the feedwater in the secondary side 300 of the boiler assembly 100 will cause inaccuracies in the rate of corrosion in the sample tubes. Moreover, since the rate of corrosion is exponentially dependent upon the ambient feedwater temperature, even small inaccuracies in the feedwater temperature will result in large errors in the tube corrosion rate. The pre-heater 31, by affording an accurate control of the temperature of the feedwater entering the primary side 300 of boiler assembly 100, allows the model steam generator 1 to accurately duplicate the rate at which corrosion occurs in the tubes of the nuclear steam generator being monitored along any selected section of the tubesheet.

The pre-heater 31 is generally formed from a housing 33 having an inlet 35 and an outlet 37. A plurality of electrical cartridge heaters 40 are disposed within the housing 33 of the pre-heater 31. The structure of these cartridge heaters 40 is essentially identical to the structure of the cartridge heaters 160 utilized in the primary side 102 of the boiler assembly 100, which will be described in detail hereinafter. In the preferred embodiment, both the cartridge heaters 40 of the pre-heater 31 and the cartridge heaters 160 used in the primary side 102 of the boiler assembly 100 are preferably encapsulated within two walls of Inconel in order to reduce the probability of heater rupture, which would have particularly serious consequences on the secondary side 300 of the boiler assembly 100. Sometimes pinhole leaks form in the walls of the rod-shaped casings of these heaters due to pitting. Such pinhole leaks could allow water to accumulate between the mgnesium oxide or aluminum oxide insulation of the heating element and the cylindrical casing surrounding it. If such water were present within the casing when the heater element was actuated, the resulting rapid transformation of the water contained within the casing into steam could cause the metallic casing to "zipper" along its longitudinal axis, thereby contaminating the feedwater flowing into the secondary side 300 with the magnesium oxide or aluminum oxide insulation surrounding the heating element. Such contamination could ruin the results of the particular test in which the model steam generator was engaged. Since such tests can cover time periods as long as three months, the resulting loss of investment in time and effort could be considerable. However, the provision of a double wall of Inconel in the cartridge heater 40 renders the probability of such a heater rupture and consequently foiled test result extremely unlikely.

The amount of electric current which is conducted through the cartridge heaters 40 is regulated by a silicon-controlled rectifier (or SCR) 44. The output of SCR 44 is electrically connected to the input leads of the cartridge heaters 40 by power cable 42. The input of SCR 44 is connected to a 220-volt, three-phase source of electrical current via power cable 46. The gate of SCR 44 is connected to output module 50 of the central processing unit 21 by cable 48. The amount of current generated by the output module 50 is controlled by the current generated by input module 52. Input module is in turn electrically connected to the output of a thermocouple 344 disposed within the feedwater present in the secondary side of the boiler assembly 100 by way of cable 54. The central processing unit 21 is programmed to maintain the temperature of the feedwater entering the secondary side 300 to within a desired range by means of the feedback loop formed by the gate-cable 48, the output module 50, the input module 52, and the thermocouple cable 54. In the preferred embodiment, SCR 44 (and all other SCRs utilized in the model steam generator 1) is wired to operate as a zero-voltaged switch (rather than a phase-angle type switch) in order to minimize the unwanted production of higher harmonics which can be disruptive to the operation of the electronic equipment of the model steam generator 1.

Turning now to the makeup water system 60 which supplies water to the primary side 102 of the boiler assembly 100, such makeup water initially enters the inlet conduit 62, where it flows past manual shut-off valve 64. Manual shut-off valve 64, like the previously discussed shut-off 5 of the feedwater system 2, is normally used to isolate the primary side 102 from the makeup water system 60 only when the motorized shut-off valve 94 is inoperative. Accordingly, manual shut-off valve 64 is almost always open. Upstream of the manual shut-off valve 64 is a positive displacement pump 66 which is flanked on its inlet and outlet sides by check valves 68a and 68b. The pump 66 is powered by an electrical motor which may be actuated by means of a relay 67. This relay 67 is in turn controlled by the central processing unit 21 in a manner which will be described in more detail hereinafter.

Upstream of the outlet of pump 66 are hydraulic intersections 69 and 78. At these intersections, some of the flow of water leaving the outlet of the pump 66 is used to prime the pressure sensing lines of the liquid level sensors 27, 86 and 429 during either an initial start-up or a "wet lay-up" of the generator 1 by opening manual valves 72 and 432, respectively. When the manual valves 72 and 432 are opened, water flows into the hydraulic lines 70a, 80 and 70b forming the hydraulic intersections 69 and 78, and thence through the pressure sensing lines 76a, 90a and 430 of liquid level sensors 27, 86 and 429, respectively. Each of the liquid level sensors 27, 86 and 429 include purge valves 74, 84 and 434 for periodically draining and cleaning the interiors of these devices.

The output of the makeup water pump 66 flows into the primary side 102 of the boiler assembly 100 through manual shut-off valve 92 and motorized flow control valve 94, as indicated. Manual shut-off valve 92 is normally never closed unless there is some failure of the motorized flow control valve 94. Like motorized valve 7 previously discussed, motorized valve 94 is a ball-type valve having positive and reliable shut-off characteristics. Both the valve 94 and the actuation of the pump 66 are controlled by the output of liquid level sensor 86 acting through the central processing unit 21. To understand how this control is accomplished, a specific understanding of the function of all the hydraulic pressure lines and electrical cables connected to the liquid level sensor 86 is necessary.

Liquid level sensor 86 includes a pair of pressure sensing lines 90a and 90b hydraulically connected to the upper and lower portions of the primary side 102 of the boiler assembly 100 through a manifold valve 88. Like the manifold valve 28 of liquid level sensor 27, this manifold valve 88 allows the liquid level sensor 86 to be fluidly disconnected from its hydraulic sensing lines without shutting down the entire generator 1 in the event it becomes necessary to replace or repair it. Further like liquid level sensor 27, sensor 86 includes both a purge valve 84 for cleaning purposes, and a valve 82 for connecting the base of the sensor 86 to the makeup water flowing out of the outlet of pump 66 for priming purposes during start-up. The liquid level sensor 86 produces an electrical signal indicative of the level of the liquid in the primary side 102 which is transmitted to an output module 95 of the central processing unit 21 by means of a cable 96. The central processing unit 21 is in turn connected to output modules 97a, 97b by cables 98a, 98b, respectively. These modules 97a, 97b control the state of the pump motor relay 67, as well as the output of a power cable 98b connected to the motor of the motorized flow valve 94. When the signal received by the input module 95 from the liquid level sensor 86 via cable 96 indicates that the level of the water in the primary side 102 is too low, the central processing unit will simultaneously close the relay 67 to start the positive displacement pump 66, and open the flow regulating valve 94 by way of output modules 97a, 97b, respectively.

Normally, once the primary side 102 is primed to provide an adequate water inventory around the heater assembly 150 of the primary side 102, no new water will need to be introduced into the primary side 102. In operation, the thermosyphon mechanism within the primary side 102 (which will be described in more detail hereinafter) constantly circulates the water inventory through the primary side 102 in "closed loop" fashion. However, if corrosion should cause one of the sample tubes 258a, 258b, 258c or 258d to crack during a test, some leakage would occur between the water in the primary side 102 and the water in the secondary side 300 of the boiler assembly 100. Under such circumstances, the liquid level sensor 86 would detect a lowering of the water level in the primary side 102, and would open the flow control valve 94 and start makeup water pump 66 in the manner heretofore described. The makeup water used in the makeup water system 60 is preferably demineralized, deaerated water, for two reasons. First, the use of such water minimizes the amount of corrosion and sludge deposits which may accumulate within the primary side 102 of the boiler assembly 100 over time. Second, such water will have the least effect upon the chemistry of the water within the secondary side 300 of the boiler assembly 100, should a cracked sample tube cause water in the primary side 102 to leak into the secondary side 300.

With reference now to FIG. 2A, the boiler assembly 100 generally comprises a primary side 102 having a heater assembly 150 for vaporizing the water inventory contained therein, a tubesheet 240 in which the sample heat exchange tubes 258a, 258b, 258c and 258d are mounted, and a secondary side 300 through which feedwater from the previously described feedwater system 2 is converted to steam by the sample heat exchange tubes extending out of the tubesheet 240.

Turning specifically now to FIGS. 2A and 1B, the exterior of the primary side 102 is formed from a cylindrical housing 104 having a floor cap 106. Floor cap 106 includes a drain bore 113a which terminates in a drain coupling 113b for cleaning purposes. As is schematically illustrated in FIG. 1B, the drain coupling 113b is fluidly connected to a purge line by way of purge valve 114. Twelve tube compression fittings (of which only two, 108a and 108b, are shown) are screwed into bores (not shown) in the floor cap 106. These compression fittings house the cartridge heaters 160 of the heater assembly 150. Each of the cartridge heaters 160 terminates in a power cable 109 for transmitting power to the heater element inside each of the heaters 160. As is further schematically illustrated in FIG. 1B, the interconnection between the power cables 109 and a source of 220-volt, three-phase power is made by way of a zero-switch SCR 110. The gate of SCR 110 is connected to output module 111 of the central processing unit 21 by way of an electric cable 112. The central processing unit 21 will open the gate of the SCR 112 to an extent dependent upon the signals it receives from both a thermocouple 142 placed over the heater assembly 150 of the primary side 102, and a watt meter 146 which is electrically connected to the power input cable 148 leading into the SCR 110. The normal mode of control is to fix the primary boiling temperature to within a desired range, and the central processing unit 21 actuates the gate of the SCR 110 to the extent necessary to bring the water within the primary side 102 of the boiler assembly 100 to within this desired temperature range, as sensed by the thermocouple 142. An alternative mode of control fixes the surface heat flux on the sample tubes 258a, 158b, 258c and 258d. In this case, the central processing unit 21 will actuate the gate of SCR 110 to produce the watt output of the heater assembly 150 to the desired value as measured by the watt meter 146. However, if the central processing unit 21 senses by means of thermocouple 169 (FIG. 2C) that the cartridge heaters 160 are operating at an excessive temperature, it will actuate an alarm circuit (not shown) to inform the operator. At a certain upper limit, this alarm circuit will also automatically shut down the heater assembly 150. The upper edge of the floor cap 106 of the primary side 106 terminates in an annular flange 116, as shown.

A clamping assembly 115 detachably connects the floor cap 106 to the cylindrical housing 104 of the primary side 102. In this clamping assembly 115, the upper annular flange 116 of the floor cap 106 abuts the bottom annular flange 120 of the primary side housing 104 through a sealing ring 118. A Grayloc ®-type clamp 122 having an annular groove 124 which is tapered on its sides receives the annular flanges 116, 120 of both the floor cap 106 and the primary side housing 104. The tapered sides of this annular groove 124 compress these flanges 116, 120 together against the sealing ring 118 in pressure and fluid sealing engagement.

The clamping assembly 115 includes two semicircular halves, of which only clamp 122 is shown in FIG. 2A. However, the ends of each of the semicircular clamp halves terminate in stud-receiving flanges which are designated 126a, 126b with respect to clamp half 122. Additionally, the stud flanges of each of the clamp halves include mutually-registering, stud receiving holes which are designated 128a, 128b and 130a, 130b with respect to clamp half 122. When the stud flanges of the two clamp halves are squeezed together by nuts which are threadedly engaged onto the ends of the studs, the tapered sides of the annular groove 124 in the clamp half 122 forcefully wedges the annular flange 116 of the floor cap and the annular flange 120 of the primary side housing 104 against the sealing ring 118 disposed between the two flanges 116 and 120.

Disposed above the clamping assembly 115 on the right side of the primary side housing 104 is a fill port 132 through which the previously described makeup water system 60 is hydraulically connected. Located on the left side of the primary side housing are a pair of fluid level ports 133 and 134 which are connected to the previously described hydraulic pressure sensing lines 90b and 90a of liquid level sensor 86. Located near the top of the primary side housing 104 is a threaded thermocouple port 138 which houses a thermocouple fitting 140 containing the previously discussed thermocouple 142. As is schematically indicated in FIG. 1B, the output of thermocouple 142 is connected to input module 143 of the central processing unit 21, and serves to control the SCR 110 which regulates the amount of power admitted to the heater assembly 150 within the primary side 102. The primary side housing 104 terminates in a top annular flange 149 as indicated.

The interior of the primary side 102 includes the previously mentioned heater assembly 150. Generally speaking, the exterior of the heater assembly 150 is formed by a cylindrical shroud 152 which defines an annular space between the inner wall of the cylindrical housing 104 and the outer surface of the shroud 152. This annular space 154 functions as a flow path for the condensate which is constantly forming and running down the inside walls of the cylindrical housing 104 of the primary side 102 from the thermosyphon mechanism formed by the interaction between the heater assembly 150, the sample tubes 258a, 258b, 258c and 258d, and the riser tubes 270a, 270b, 270c and 270d, and the downcomer tubes 170a, 170b, 170c, 170d, 170e and 170f. The interior surface of the shroud surrounds a pair of support plates 156a, 156b having a mutually registering array of apertures 158, which is best seen with reference to FIG. 2B. These support plates 156a, 156b serve to support and space the plurality of cartridge heaters 160 which are slidably inserted into mutually registering pairs of apertures 158 existing within these plates.

FIG. 2C illustrates the specific structure of the cartridge heaters 160 used both in the heater assembly 150 as well as the pre-heater 31. Each of the cartridge heaters 160 generally comprises a rod-like body 161 having a double-walled structure 162, 163. Each of the walls 162, 163 are preferably formed from a heat-resistant metal, such as Incolloy 800. Disposed within the double walls 162, 163 of Incolloy is a heating element 165 surrounded by either aluminum oxide or magnesium oxide. As previously discussed with respect to the pre-heater 31, the provision of a double-walled enclosure around the heating element 165 substantially reduces the probability that water will leak into the walls 162, 163 and around the heating element, which in turn could cause the body 161 of the heater 160 to burst and chemically contaminate the water in the primary side 102 of the boiler assembly 100. While double-walled cartridge heaters 160 are the preferred type of heaters for both the pre-heater 31 and the heater assembly 150, it should be noted that the double-walled structure is more important with respect to the pre-heater 31. A ruptured cartridge heater here in the inlet side of the model steam generator 1 will cause an immediate contamination of the chemistry of the feedwater entering the secondary side 300, which would very likely ruin the accuracy of the simulation. By contrast, if any of the cartridge heaters 160 within the primary side heater assembly 150 should rupture, the resultant chemical contamination would probably not ruin the accuracy of the simulation unless one of the sample tubes 258a, 258b, 258c or 258d were cracked to the extent which allowed substantial amounts of water to leak from the primary side 102 to the secondary side 300. Since the presence of such a cracked tube would be unusual, single-walled cartridge heaters may be used in the heater assembly 160 in lieu of the preferred double-walled cartridge heaters which should be used in the pre-heater 31; however, the use of double-walled cartridge heaters in both is preferred.

Turning now to FIG. 2D, the upper portion of the shroud 152 of the heater assembly 150 circumscribes a shroud cap 172 as shown. An annular recess 174 circumscribes the perimeter of the cap 172 and forms an annular shoulder 175. The annular recess 174 and shoulder 175 receive the upper edge of the shroud 152 in the abutting engagement illustrated. Such an arrangement allows the upper portion of the shroud to positively engage the shroud cap 172 without an enlargement of the cylindrical diameter of the heater assembly 150, which could obstruct the aforementioned condensate return path which is defined between the outer walls of the shroud 152 and the inner walls of the cylindrical primary side housing 104. The face of the shroud cap 172 includes bores for receiving both downcomer tubes 170a, 170b, 170c, 170d, 170e and 170f, as well as bores 176a, 176b, 176c and 176d having frustro-conical recesses 178a, 178b, 178c and 178d, for receiving steam funnels 180a, 180b, 180c and 180d. The downcomer tubes 170a through 170f provide an alternative return path for the condensate flowing down from the inner walls of the sample heat exchange tubes 258a, 258b, 258c and 258d.

Figure 2E:
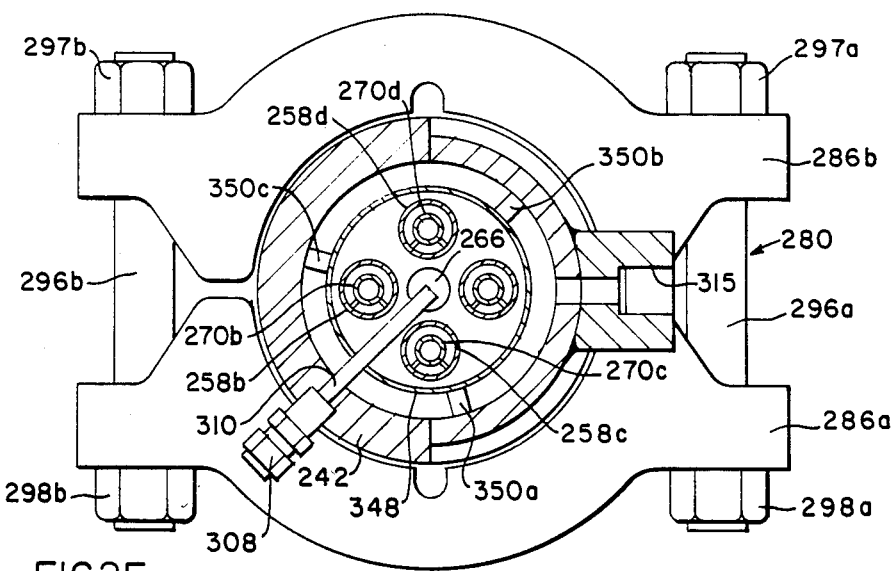
FIG. 2E is a plan, cross-sectional view of the boiler assembly, taken along line 2E—2E of FIG. 2A.
Figure 2B:
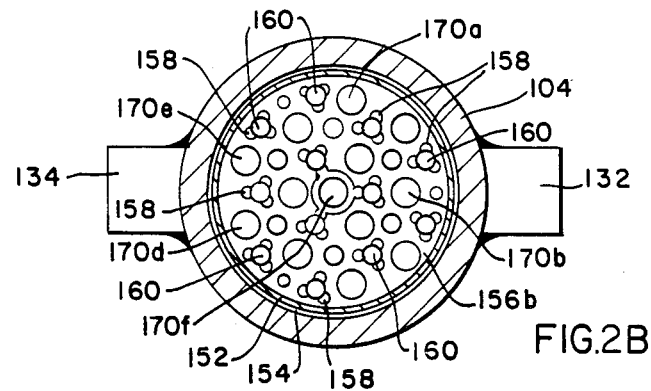
FIG. 2B is a plan, cross-sectional view of the boiler assembly, taken along line 2B—2B of FIG. 2A.

As is best seen in FIG. 2B, the downcomer tubes 170a through 170f are arranged in a roughly pentagonal configuration throughout the cartridge heaters 160 in the heater assembly 150, with downcomer tube 170f centrally disposed within the array of cartridge heaters 160. The downcomer tubes perform two specific and important functions. First, they increase the hydraulic conductivity along the condensate return path of the thermosyphon mechanism by increasing the cross-sectional area of this path. Second, they direct the condensate in a uniform pattern through the array of cartridge heaters 160 of the heater assembly 150, thereby facilitating the transfer of heat from the cartridge heaters to the water inventory which accumulates at the bottom of the primary side 102. Both of these functions increase the efficiency of the evaporating-condensing thermosyphon loop between the steam entering the sample tubes 258a, 258b, 258c ad 258d from the heater assembly 150, and the condensate which flows down the inner walls of these tubes back into the inventory of water which accumulates at the bottom of the primary side 102. This increased efficiency not only lowers the energy requirements of the model steam generator 1, but also increases the life of the cartridge heaters 160 of the heater assembly, by increasing the volume of relatively cooler water which flows over them. Heater life expectancy is dependent upon the square of the surface temperature of the heater; consequently, an increased flow of relatively cooler water substantially protracts the life expectancy of the cartridge heaters 160. The funnels 180a, 180b, 180c and 180d likewise improve the efficiency of this thermosyphon mechanism by guiding the steam produced by the heater assembly 150 into riser tubes 270a, 270b, 270c and 270d which conduct the steam to the closed ends of the sample heat exchange tubes 258a, 258b, 258c and 258d. As will be discussed in detail hereinafter, riser tubes 270a, 270b, 270c and 270d perform an important function in the thermosyphon mechanism by insulating the stream of condensate running down the inside walls of the sample tubes from the upwardly directed flow of steam which could cause heat-blocking ripples to form in the film of condensate flowing down the inside walls of the sample tubes, thereby rendering non-uniform the pattern of radial and longitudinal heat flux.

With reference back to FIG. 1B, pressure within the primary side is regulated by means of a pressure sensor 135. Pressure sensor 135 is hydraulically connected to the primary side housing via hydraulic line 136.1. Hydraulic line 136.1 also includes a pressure gauge 136 for providing a visual pressure read-out of the pressure sensed by sensor 135 for the operator of the generator 1. Pressure gauge 136 is electrically connected to an input module 137 by cable 137.1. Although not indicated in the drawing, module 137 is electrically connected to the central processing unit 21 which is programmed to disconnect the power to the heater assembly 150 in the event that sensor 135 transmits a signal indicative of an over-pressure condition. Just in case sensor 135 fails to warn the central processing unit of an over-pressure condition, the primary side 102 includes a pressure outlet port 184 which is fluidly connected to a rupture disk 190 via conduits 188 and 192. The rupture disk 190 will break and release steam pressure from the primary side 102 of the boiler assembly 100 in the event an emergency over-pressure condition arises in the primary side 102. Pressure outlet port 184 is also fluidly connected via manually operable valve 186 and conduit 188 to the steam outlet conduit 346 of the secondary side 300, and a vacuum source 200, a source of pressurized nitrogen 204, and a vent 208 through valves 198, and 202, 206 and 209, respectively. When valve 186 is opened, pressure outlet port 184 may be fluidly connected to the steam outlet conduit 346 (and thence to secondary side 300) through valve 198. When valve 186 is open, the pressure outlet port 184 may further be connected to vacuum source 200 through the manually operable valve 202, the source of pressurized nitrogen through valve 206, and the vent through valve 209. Pressure gauges 203 and 207 are pneumatically connected between the valves 202 and 206 and their respective vacuum and nitrogen sources 200 and 204. A back-pressure regulator 210 is pneumatically connected between vent source 208 and vent valve 209, as indicated.

The valves 186, 198 and 206 are useful in the initial start-up of the system, and the "wet-layup" process. In the wet-layup process, the primary side 102 of the boiler assembly 100 is filled to the proper level via the makeup water system 60, and the secondary side 300 is filled to an appropriate level with feedwater from the feedwater inlet conduit 3. Next, the air inside both the primary side 102 and the secondary side 300 is displaced with nitrogen from the compressed nitrogen source 204 by opening valves 186, 198 and 206. The back-pressure regulator 210 maintains enough back pressure in the nitrogen atmosphere in the primary side 102 to completely saturate with nitrogen the water present in the primary side 102. Valve 202 allows the operator to pull a vacuum on either the primary side 102 by opening valves 202 and 186, or the secondary side 300 by opening valves 202 and 198. The ability to pull such a vacuum is useful when it becomes desirable or necessary to purge the atmosphere in either the primary side 102 or the secondary side 300. Finally, valve 209 allows the operator to selectively vent either the primary side 102 by opening valve 186, or the secondary side 300 by opening valve 198. All the aforementioned capabilities are important because they allow the model steam generator 1 to simulate all the major temperature, pressure and atmospheric conditions which are present inside an actual nuclear steam generator during the wet-layup process.

Turning back now to FIG. 2A, the upper flange 149 of the primary side 102 is sealingly engaged by means of clamping assembly 215 to the lower annular flange 219 of the tubesheet 240. Clamping assembly 215 is a Grayloc ®-type pressure clamp which detachably connects the primary side 102 to the tubesheet 240. Structurally, it is identical in all respects to the previously described clamping assembly 115. Specifically, the clamping assembly 215 includes a sealing ring 217 disposed between the upper flange 149 of the primary side 102, and the lower flange 219 of the tubesheet 240. Additionally, it includes a pair of semicircular clamps, of which only clamp 221 is visible. Both of these clamps include a tapered, annular groove 223 for squeezing the annular flanges 149, 219 inwardly against the sealing ring 217 when appropriate studs are bolted in stud flanges 225a, 225b through stud holes 227a, 227b and 229a, 229b.

The tubesheet 240 itself includes a cylindrical body 242 which is circumscribed by a tubesheet guard heat assembly 244. This heat assembly 244 is schematically shown in FIG. 1B. The tubesheet heat assembly 244 includes a plurality of electrical heating elements 246 which are connected to 240-volt, single-phase power cables 248a, 248b through a zero-switch SCR 250. The gate of the SCR 250 is electrically connected to an output module 251 of the central processing unit 21 via cable 252. Central processing unit 21 is in turn connected to input module 253. A thermocouple 254 transmits a signal indicative of the temperature of the heating assembly 244 to the input module 253 through cable 255. The central processing unit 251 compares the temperature signal transmitted to it from thermocouple 254, with a pre-programmed temperature range, and transmits an electrical control signal along the gate of the SCR 250 which causes the SCR 250 to regulate the amount of electrical power transmitted to the heater elements 246 in order to maintain the temperature of the tubesheet guard heat assembly 244 within the desired pre-programmed limits. The tubesheet guard heat assembly 244 allows the model steam generator 1 to substantially duplicate the heat flux pattern which exists in the tubesheet of an actual nuclear steam generator both in the radial direction and along the longitudinal axis of the tubesheet. If the tubesheet guard heat assembly 244 were not present in the invention, heat losses out of the sides of the tubesheet 240 would generate disparities between the heat flux in the tubesheet of the model steam generator and the heat flux of the tubesheet in the nuclear steam generator being monitored.

Turning back to FIG. 2A, the cylindrical body 242 of the tubesheet 240 includes four bores 256a, 256b, 256c and 256d for receiving the previously mentioned sample tubes 258a, 258b, 258c and 258d, respectively. The sample tubes are preferably of the same metallic composition, diameter and wall thickness as the heat exchange tubes present in the secondary side of the nuclear steam generator being monitored. Additionally, the ends of the sample tubes which are disposed in the secondary side 300 of the boiler assembly 100 are preferably closed by means of tube plugs 260a, 260b, 260c and 260d, whereas the ends of the sample tubes facing the primary side 102 are preferably open as indicated at 262a, 262b, 262c and 262d.

At the top of the tubesheet 240, a sludge cup 263 is provided which allows sludge samples taken from the nuclear steam generator being monitored to be placed around the sample heat exchange tubes 258a, 258b, 258c and 258d in order to test the capacity of this sludge to induce corrosion in the walls of these tubes. A drain bore having a vertical section 264 and a horizontal section 268 is placed beneath the sludge cup 263 in order to allow the operator of the model steam generator 1 to completely drain the secondary side 300 of all water, should such draining become desirable. In order to keep sludge from entering the drain bore sections 264 and 268, a porous plug 266 is placed over the top of the vertical section 264 in the position illustrated in FIG. 2A. At the bottom of the tubesheet 240, riser tubes 270a, 270b, 270c and 270d are concentrically disposed within the sample tubes 258a, 258b, 258c and 258d by means of cylindrical couplings 274a, 274b, 274c and 274d which frictionally couple the riser tubes to the mouths of the funnels 180a, 180b, 180c and 180d extending out of the shroud cap 172.

As is best seen in FIGS. 2E and 2F, the riser tubes 270a, 270b, 270c and 270d are concentrically disposed within their respective sample tubes and extend almost the entire length of these tubes. The riser tubes 270a, 270b, 270c and 270d serve the important function of maintaining a radially uniform heat flux in the sample tubes at any given point along their longitudinal axes by insulating the film of condensate which flow down the inner walls of these tubes from the fluid shear which it would otherwise experience if they were exposed to the upcoming stream of steam. As previously indicated, such shear forces can cause heat-blocking ripples to form in the condensate film which will cause irregularities in the desired heat flux pattern. In addition to insulating the flow of condensate from these fluid shear forces, it should be noted that the riser tubes 270a, 270b, 270c and 270d actually create a positive pressure differential in the annulus defined between the outer walls of the riser tubes and the inner walls of the sample tubes. This positive pressure differential is strongest in the region near the plugged ends of the sample tubes, and helps gravity pull the condensate film down these annular spaces, thereby further insuring that no ripples of fluid "webs" will form between the inner walls of the sample tubes 258a, 258b, 258c and 258d and the outer walls of the riser tubes 270a, 270b, 270c and 270d. These riser tubes also allow the use of much larger sample tubes than has heretofore been possible in prior art, flux-type systems. Specifically, the length of the sample tubes 258a, 258b, 258c and 258d may be up to twenty-four inches before material variations appear in the heat-flux pattern surrounding the sample tubes. The ability of the model steam generator to use such long sample tubes allows the operator to place sample support plates within the secondary side 300 of the boiler assembly 100 and substantially duplicate the thermohydraulic conditions around the support plate regions of the nuclear steam generator being monitored.

Another Grayloc®-type clamping assembly 280 detachably connects the upper, annular flange of the tubesheet 276 with the lower annular flange 284 of the secondary side 300, as is best seen in FIGS. 2A and 2E. Like the previously discussed clamping assembly 115, this clamping assembly 280 includes a sealing ring 282 and a pair of semicircular clamps 286a, 286b having tapered grooves 288 which squeeze the annular flanges 276 and 284 into the sealing ring 282 in fluid-tight engagement when studs 296a, 296b are nut-mounted into the stud holes 292a, 292b and 294a, 294b of the stud flanges 290a, 290b of the clamps 286a, 286b.

The secondary side 300 of the boiler is largely formed by cylindrical body 302. At its bottom end, this cylindrical body 302 includes a liquid level port 304, as well as a blow-down port 306 which receives a blow-down fitting 308. The blow-down fitting 308 is in turn connected to blow-down pipe 310. In order to give the blow-down components of the model steam generator the same relative capacities of the blow-down components they simulate in a full-scale nuclear steam generator, the spacing between the blow-down pipe 310 and the tubesheet 240 is carefully dimensioned so that the effectiveness of the pipe 310 in drawing the sludge from the cup 263 is very nearly the same as the blow-down pipe in a full-scale nuclear steam generator. Located above both the liquid level port 304 and the blow-down fitting 308 is the feedwater inlet 315 which is fluidly connected to the previously described feedwater inlet system 2. A second liquid level port 319 is located above the feedwater inlet 315. The liquid level ports 315 and 319 are connected to the previously described hydraulic pressure sensing lines 76a and 76b connected to the liquid level sensor 27. Located across from the highest liquid level port 319 is a pressure tap port 317. As will be discussed hereinafter, pressure tap port 317 is connected to a pressure sensor 375 which controls the pressure in the secondary side 300 of the boiler assembly through the central processing unit 21.

At its top, the cylindrical body 302 of the secondary side 300 terminates in an annular flange 321. Annular flange 321 is sealingly engaged to the annular flange at the lower end of a boiler cap 323 by means of clamping assembly 330. Clamping assembly 330 is another Grayloc®-type arrangement which detachably connects the boiler cap 323 to the upper end of the secondary side 300. Like each of the previously described clamping assemblies 115, 215 and 280, clamping assembly 330 includes a sealing ring disposed between the flanges 321, 325 of the cylindrical body 302 of the primary side 300 and of the boiler cap 323. Additionally, clamping assembly 330 includes semicircular clamps 334 internally circumscribed by tapered grooves 336 which function to squeeze the annular flanges 321 and 325 into the sealing ring 332 in pressure-sealing engagement.

Finally, each of the semicircular clamps includes stud flanges 338a, 338b and mutually registering stud holes 340a, 340b and 342a, 342b for receiving nut-mounted studs. The top end of the boiler cap 323 includes a steam outlet fitting 345 at its center, and a thermocouple port 344 for housing a thermocouple. The steam outlet fitting 345 is coupled to the steam conduit 346 as indicated in FIG. 1B.

The interior of the secondary side 300 contains a generally cylindrical riser barrel 348. The top end of the riser barrel 348 is closed by means of a cap 365 having a funnel-shaped orifice 366 for directing the column of steam produced by the secondary side 300 into steam outlet fitting 345. The bottom end of the riser barrel 348 is open, and includes three alignment keys 350a, 350b and 350c for maintaining the cylindrical body of the barrel 348 concentrically disposed within the inner walls of the primary side 300. The bottom portion of the riser barrel 348 encloses the sample tubes 258a, 258b, 258c and 258d as indicated. The upper portion of the riser barrel 348 includes a separator assembly 355 for separating liquid droplets of water from the column of steam produced by the secondary side 300.

Turning now to FIGS. 2H, 2I and 2J, the separator assembly 355 includes a stack of large-droplet separator grids 357a through 357i in the vertical positions indicated in FIG. 2H. As best seen in FIG. 2I, each of the large-droplet separator grids 357a through 357h includes four parallel separator deflector members 359. Each of the separator deflector members 359 is a semi-cylindrical member. The deflectors 359 of each of the large-droplet separators 357a through 357i all present their convex sides toward the flow of steam ascending through the riser barrel 348. Additionally, each of the deflector members 359 of the large-droplet separator grids are inclined approximately 5° to the horizontal. Such an inclination causes the large droplets which impinge upon the concave surfaces of the semi-cylindrical members to run down along the longitudinal axes of these deflector members and drain down the inner walls of the riser barrel 348, where they combine with the feedwater at the bottom of the secondary side 300. Although not shown in any of the several figures, each of the large-droplet separator grids 357a through 357i is angularly displaced from the grids underlying and overlying it by an angle of 45°. Such angular displacement between the nine large droplet separator grids 357a through 357i insures that any plume of droplet-laden steam which fails to impinge one of the semi-cylindrical separator deflector members 359 in one of the grids 357 will necessarily engage one of these deflector members 359 in a subsequent separator grid 357. Such angular displacement of the various deflector members 359 of the large droplet separator grids 357a through 357i also lends a radial component of motion to the steam current flowing away from the sample heat exchange tubes 258a, 258b, 258c and 258d, which encourages the large droplets which coalesce on the bottoms of the semi-cylindrical deflector members 359 and to drain down the sides of the riser barrel 348.

As may best be seen with reference to FIG. 2H, separator assembly 355 further includes a stack of small-droplet separator grids 361a through 361k. Each of the small droplet separator grids includes a larger number of smaller, semicylindrical deflector members 363, as may best be seen with reference to FIG. 2J. As was the case with the deflector members 359, the concave side of each of the semi-cylindrical deflector members 363 is disposed toward the flow of steam rising from the sample heat exchange tubes 258a, 258b, 258c and 258d. Further like the large-droplet separator grids 357, each of the small droplet separator grids 361 is angularly disposed 45° from the small droplet separator grids 361 disposed immediately above and below it. Such a relative radial displacement of each of the small-droplet separator grids 361 relative to its neighboring grids again insures that all portions of the stream of steam flowing through the separator assembly 355 will impinge the concave surface presented by the semi-cylindrical deflector members 363 of the grids 361a through 361k. Such an angular displacement will also add the previously discussed angular component of motion to the stream of steam flowing upwardly through the riser barrel 348 along with the consequent, advantageous drainage effects. The only major structural difference between the stack of large-droplet separator grids 357a through 357i and the stack of small-droplet separator grids 361 through 361k (other than the fact that the small-droplet separator grids include more of the semi-cylindrical deflector members 363) is the fact that these deflector members 363 are not inclined to the horizontal, but rather are substantially horizontally disposed. Such a horizontal inclination is not necessary, as the lateral pressures along the bottom concave surfaces of the deflector members 363 will cause the water droplets which impinge and coalesce upon them to migrate towards the walls of the riser barrel 348.

The aforementioned stacks of angularly disposed separator grids 357a through 357i and 361a through 361k are highly effective in separating out the water droplets entrained in the column of steam ascending through the riser barrel 348. The inventors have found that the separator assembly 355 formed by these stacks removes all but about 1/10th of one percent of the water entrained in this stream. Such a low loss of water allows the secondary side 300 to accumulate sludge at a rate greater than that of the nuclear steam generator being monitored, since the water losses in nuclear generators are typically about $\frac{1}{4}$th of one percent. The sludge accumulation rate is dependent upon such water losses, because the "lost" water carried away by the steam carries with it dissolved, sludge-producing chemicals which would have remained in the secondary side 300 if the steam produced by the generator were completely dry. The provision of a separator assembly 355 which is two and one-half times more effective in reducing water losses through the steam conduit 346 allows the model steam generator to accumulate sludge in either a real-time mode, or in a greatly accelerated predictive mode merely by adjusting the rate at which the system is blown-down. If the relative water losses out of the secondary side 300 of the model steam generator 1 were relatively greater than that of the nuclear steam generator being monitored, the model steam generator could not simulate the sludge accumulation rate in the nuclear steam generator on a real-time basis.

Turning now to FIGS. 1B and 1C, the steam pressure within the secondary side 300 of the boiler assembly 100 is regulated by two different devices. First, in the event of an emergency high pressure condition, the interior of the secondary side 300 is hydraulically connected to a rupture disk 367 by means of conduit 369. The rupture disk 367 is calibrated to break and release steam from the interior of the secondary side 300 well before this steam pressure approaches the pressure limits of the secondary side cylindrical body 302. However, as mentioned before, the rupture disk 367 operates only under extreme emergency conditions. Under normal conditions, the pressure within the secondary side 302 is regulated by means of pressure sensor 375, which coacts with the condenser assembly 400 to cool the steam flowing out of the secondary side 302 to achieve a desired pressure. The pressure sensor is fluidly connected to the pressure tap port 317 of the secondary side 300 by way of pressure line 377. The output signal of the pressure sensor 375 is received by input module 387 via cable 389. An output module 391, which is also connected to the central processing unit 21, is connected to the speed control 395 of the electric motor which drives the blower 403 of the condenser assembly 400 by way of a 220-volt, three-phase power cable 399. The steam outlet conduit 386 of the primary side 302 of the boiler assembly 100 is fluidly connected to the condenser 407 of the condenser assembly as shown. The condenser 407 is in turn formed from a primary set of condenser tubes 409, and a secondary set of condenser tubes 411 which are thermally coupled to the air flow of the blower 403 controlled by the variable speed motor control 395. Depending upon the signal received by the pressure sensor 375, the speed of the blower 403 of the condenser assembly 400 will blow more or less air over the primary and secondary sets of tubes 409 and 411 via wind shroud 405 in order to adjust the condensation rate of the steam in conduit 346, and thereby maintain the pressure within the secondary side 300 of the boiler assembly 100 to within a pre-programmed limit. In closing, it should be noted that a pressure gauge 379 is pneumatically connected to the pressure line 377 by way of pressure line 381. Pressure gauge 379 provides a visual indication of the amount of pressure within the secondary side 300 which is observable by the operator of the system.

Turning now to FIG. 1C and a more detailed description of the structure of the condenser assembly 400, the condensate created by the primary set of condenser tubes 409 is collected in conduit 415, while the condensate created by the secondary set of condenser tubes 411 is collected by conduit 417. The conduits 415 and 417 converge into main condensate conduit 419, as indicated. An important feature of the invention is the provision of a motorized valve 418 in primary condensate conduit 415. The provision of motorized valve 418 allows the condenser assembly 400 to either simultaneously utilize the primary and secondary sets of condensate tubes 409 and 411, or to use only the secondary set of condenser tubes 411, depending upon whether the valve 418 is open or shut. Hence, motorized valve 418 functions as a banking means to selectively shut off some of the tubes of the condenser 407. This has the advantageous consequence of greatly improving the turn-down ratio of the condenser assembly 400 as a whole, which allows the model steam generator 1 to accurately simulate a greater range of steam pressure conditions within the nuclear steam generator being monitored.

The condensate produced by the condenser assembly 400 ultimately flows into the hot well 420 from the main condensate conduit 419. The outlet of the hot well 420 is in turn connected to a sub-cooler assembly 423 which cools and discharges both the condensate formed by the condenser assembly 400 and the blow-down water flowing out of the previously discussed blow-down outlet 308 of the secondary side 300.

The manner in which the hot well 420 and sub-cooler assembly 423 cool and discharge the condensate from the condenser assembly 400 will be discussed first. The hot well 420, working in cooperation with a liquid level sensor 429, maintains an equilibrium between the amount of condensate formed by the condenser assembly 400 and the amount of condensate cooled and discharged by the sub-cooler assembly 423, so as to keep the hot well 420 about half full of water at all times. One of the sides of the liquid level sensor 429 is fluidly connected to the hot well outlet conduit 422 through pressure line 427. The other side of the liquid level sensor 429 is fluidly connected to the condensate outlet conduit 419 by pressure line 430. Both of the hydraulic sensing lines 427 and 430 are connected to the liquid level sensor 429 by means of a manifold valve 428 in order that the liquid level sensor 429 may be easily repaired or replaced without shutting down the entire model steam generator. By sensing the differential pressure between both sides of the hot well 420, the liquid level sensor 429 can infer the level of liquid inside the hot well. The liquid level sensor 429 maintains the liquid level within the hot well 420 to within a desired range by modulating a pneumatically-operated discharge valve 446 through the central processing unit 21. This control is implemented in the following manner. First, condensate flowing through the outlet conduit 422 of the hot well 420 is led into a serpentine pattern of sub-cooler coils 424, where the condensate is cooled to a temperature of at least 200° F. to avoid "flashing" at the discharge end. The cooled condensate exits the sub-cooler coil 424, and flows into the flow regulating valve 446 through conduit 426. The liquid level sensor 429 is electrically connected to an input module 438 of the central processing unit 21 by means of an electric cable 436. The output of the central processing unit 21 is connected to a current-to-pressure regulator 442 by way of output module 440, and electric cable 444. The current-to-pressure regulator 442 regulates the amount of compressed air flowing into the pneumatically-controlled flow valve 446 by way of pneumatic line 448. The central processing unit 21 will modulate the pneumatically-operated valve 446 in accordance with the signals it receives from the liquid level sensor 429 which are in turn indicative of the level of the water within the hot well 420. After exiting the flow valve 446, the cooled condensate continues on to a discharge tank 692 (shown in FIGS. 3A through 3D) through motorized shutoff valve 450, and manually controlled shutoff valve 456. The motorized shutoff valve 450 is electrically connected to an output module 452 of the central processing unit 21 by means of an electric cable 454. If the central processing unit 21 receives a signal from the liquid level sensor 429 that there is little or no level in the hot well 420, and that live steam is about to enter the discharge conduit 426, it will order the motorized shutoff valve 450 to shut by way of output module 452 and cable 454.

Turning now to the manner in which the sub-cooler assembly cools and discharges the blow-down water from the secondary side 300 of the boiler assembly 100, such blow-down water is initially ejected from the blow-down fitting 308 into conduit 460, which in turn discharges it into the blow-down settling tank 462. In settling tank 462, particulate solids in the blow-down water are given an opportunity to form a sludge at the bottom of the tank. This sludge is periodically purged through purge valve 464, which controls the flow of blow-down water from the bottom of the tank through drain conduit 466 as indicated. The partially de-sludged blow-down water remaining in the settling tank 462 flows from tank 462 to the tank outlet conduit 468 and into the blow-down sub-cooler coil 425 of the sub-cooler assembly 423. Like the condensate sub-cooler coil 424, the blow-down sub-cooler coil 425 is thermally connected by way of wind shroud 425.1 to the stream of cooling air which is generated by the blower 425.2 of the sub-cooler assembly 423. For start-up or wet-layup purposes, the blow-down water flowing through conduit 468 is connected to a nitrogen sparging system 470 by way of a sparging conduit 472 which is controlled by a manually operated gas valve 474. During either the start-up or wet-layup of the model steam generator 1, nitrogen gas may be bubbled through the sparging conduit 472 and up through conduit 468, and into the secondary side 300 of the boiler assembly 100. The provision of a sparging system 470 allows the operator to more quickly saturate the feedwater flowing into the secondary side 300 by bubbling the nitrogen up through the bottom of the secondary side 300 rather than merely providing a nitrogen atmosphere above the feedwater in the secondary side 300. While the latter method would work, the time required for saturation of the feedwater with nitrogen would be much longer.

As is schematically indicated in FIG. 1C, the blow-down sub-cooler coil 425 of the sub-cooler assembly 423 includes three serpentine turns. Additionally, it should be noted that the blow-down sub-cooler coil 425 is closer to the wind stream generated by the blower 425.2. Since the flow of blow-down water through the blow-down outlet system 458 is only about one percent of the amount of liquid water produced by the condenser assembly 400, the three serpentine turns provided in the blow-down sub-cooler coil 425 provide a disproportionately greater amount of surface cooling area for the blow-down flow than the thirteen serpentine turns provides for the condensate generated by the condenser assembly 400. The high number of serpentine turns in the coil relative to the volume of blow-down water passing through it, coupled with the fact that these turns are closest to the blower 425.2, results in a cooling of the blow-down water to close-to-ambient temperature. This, in turn, allows samples to be easily and conveniently drawn of at any one of a number of sample discharge outlets (not shown) downstream of the coil 425. The cooling of the blow-down water to well below 212° F. also provides positive insurance that no "flashing" will occur at any point in the blow-down outlet 458, which could create a pressure surge in the region of the blow-down fitting 308. Such a pressure surge in this region could expel blow-down water so quickly out of the secondary side 300 that the model steam generator 1 would no longer be accurately simulating the rate at which the nuclear steam generator being monitored accumulates sludge in the area around its tubesheet.

The regulation of the amount of blow-down water which is allowed to flow through the blow-down outlet system 458 is accomplished by means of a flowmeter 478 which is hydraulically connected to the blow-down sub-cooler coil 425 by means of conduit 476. In the preferred embodiment, flowmeter 478 is a Model FMI thermal flowmeter manufactured by Thermal Instruments Corporation of Trevose, Pa. The output of the flowmeter 478 modulates a pneumatically operated flow-regulating valve 490 in the following manner.

First, the output of the flowmeter 478 is transmitted to an input module 482 of the central processing unit 21 by means of an electric cable 480. The central processing unit 21 in turn transmits an electric control signal to output module 484 which is connected to a current-pressure transducer 486 by means of electric cable 488. The current-pressure transducer regulates air flow through a compressed air line 492 which is in turn pneumatically connected to the flow regulating valve 490. The blow-down water exiting the flow regulating valve 490 normally is discharged to a blow-down collection tank 692 (shown in FIGS. 3A through 3D) by way of motorized shutoff valve 494 and manually controlled shutoff valve 500, both of which are normally open. However, should it become desirable to disconnect the blow-down outlet system 458 from the blow-down collection tank 692, motorized shutoff valve 494 will be actuated by means of an output module 496 which is electrically connected to the central processing unit 21. The output module 496 is basically a switch which controls a flow of current through a power cable 498. In the event that the motorized valve 494 is inoperable, the system operator will then manually close shutoff valve 500 to accomplish the desired isolation between the blow-down outlet system 458 and the blow-down collection tank.

In order to control the temperature of both the liquid condensate exiting the condensate sub-cooler coil 424 and the blow-down water leaving the blow-down sub-cooler coil 425, a motor speed control assembly 502 is provided which controls the amount of cooling air that the sub-cooler blower 425.2 produces. The motor speed control assembly 502 includes a variable speed controller 504 which regulates the amount of power that the blower motor receives from the power cable 506. The output of the variable speed motor controller 504 is connected to the electric motor of the blower 425.2 by way of power cable 508. The variable speed motor controller 504 is in turn controlled by means of a control signal generated by the central processing unit 21. This control signal is dependent upon the temperature sensed by thermocouple 518 thermally coupled to the output conduit 426 of the condensate sub-cooler coil 424. Specifically, the variable speed motor controller 504 is connected to an output module 512 of the central processing unit 21 by means of a cable 410. The central processing unit 21 further includes an input module 415 which is electrically connected to the output of the aforementioned thermocouple 518 by means of thermocouple line 516. The electric motor of the blower 425.2 will turn slower or faster depending on whether the thermocouple 518 senses a temperature which is lower or higher than a pre-selected temperature range stored within the memory of the central processing unit 21.

Before leaving the detailed description of the boiler assembly 100, it should be noted that the various components of this assembly provide a model steam generator which is not only capable of accurately simulating the thermohydraulic conditions inside a nuclear steam generator, but which will tend to err on the conservative side if any material departures occur between the simulated thermohydraulic conditions and actual thermohydraulic conditions. As previously mentioned, the relatively greater efficiency of the separator assembly 355 results in a faster rate of sludge accumulation within the secondary side 300. Two other features of the boiler assembly 100 which further contribute to this conservative error tendency include the relatively slower feedwater rate of the feedwater entering the secondary side 300, and the relatively greater pressure to which the sample tubes are subjected during tests. The slower feedwater rate encourages sludge to accumulate and to ensconce itself in the crevice regions of the secondary side 300. The higher pressure within the sample tubes 258a, 258b, 258c and 258d subjects the sample tubes to about six percent more "hoop-stress", which is a known contributor to the corrosion rate of the tubes. The overall tendency to err on the conservative side is clearly advantageous, considering the dangerous consequences associated with a model steam generator which indicated that the tubes were in better shape than they actually were (i.e., tube cracking and radioactive contamination of the secondary side of the generator vs. a somewhat premature maintenance program).

Figure 3A:
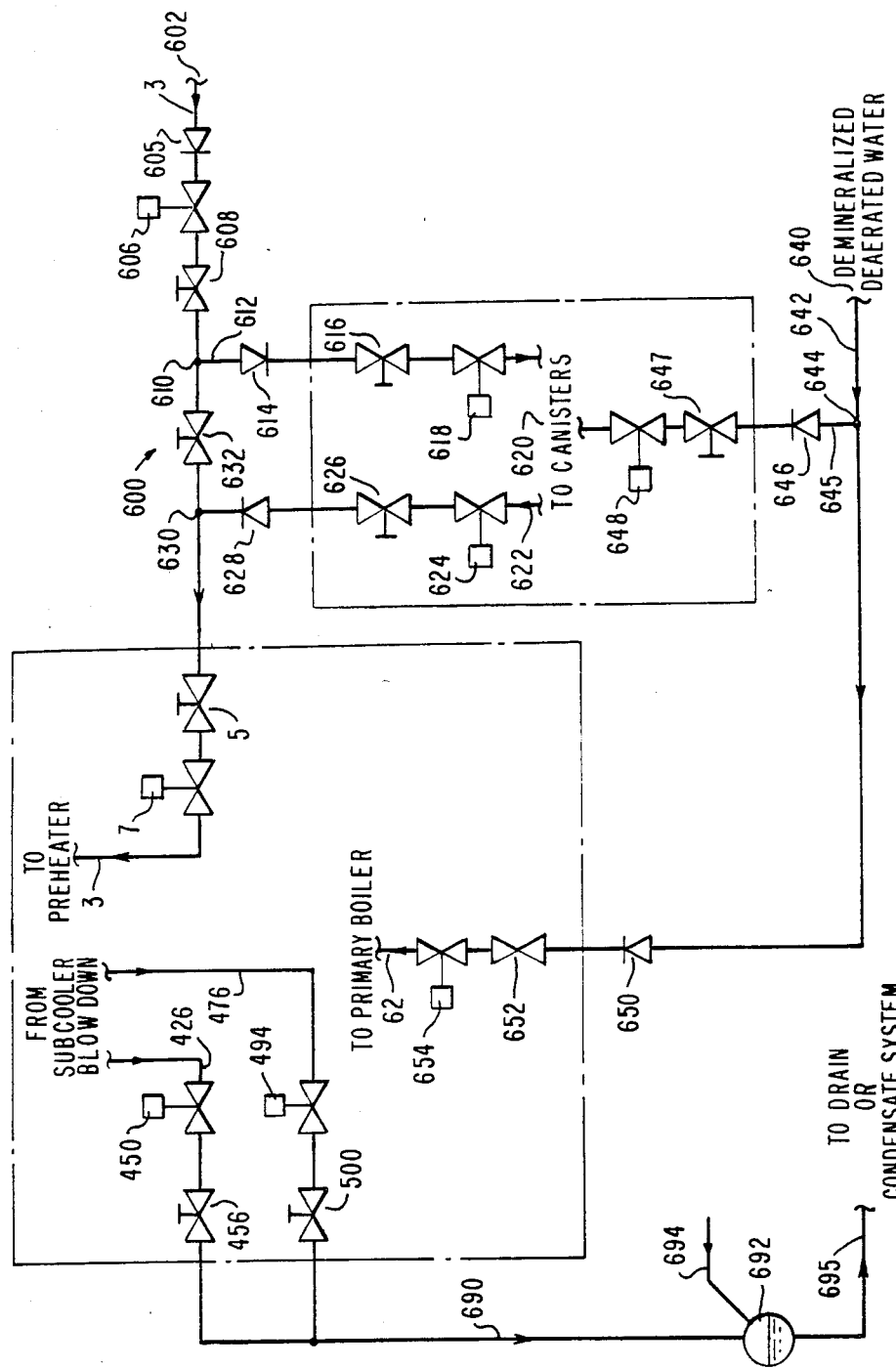
FIG. 3A is a schematic view of the preferred feedwater inlet system of the invention.

With reference now to FIG. 3A, the hydraulic feedwater system 600 of the model steam generator 1 is generally comprised of three components, including the previously discussed feedwater inlet conduit 3 for conducting feedwater from the nuclear steam generator being monitored directly to the pre-heater 31 of the generator, an array of water cannisters 620 which are hydraulically connected to the feedwater conduit 3 for providing a feedwater reservoir, and a source of demineralized, deaerated water 640 which is fluidly connected to the cannisters 620. Each of these three major components, and the interrelationship between them, will now be discussed in detail.

The feedwater inlet conduit 3 includes a check valve 605, a motorized shutoff valve 606, and a manually operated shutoff valve 608 between the feedwater source 602 and hydraulic "T" intersection 610. In the preferred embodiment, the feedwater source 602 is the same source of feedwater used in the nuclear steam generator being monitored. Additionally, the feedwater conduit 3 includes a means for maintaining the fluid velocity at a rate which insures that the flow will be turbulent and that particulate solids in the feedwater will not have an opportunity to settle out in the conduit before the feedwater is introduced into the primary side 300 of the boiler assembly 100. The specific means for maintaining such a turbulent, anti-settling flow will be discussed hereinafter. The check valve 605 insures that none of the feedwater introduced into the hydraulic feedwater system 600 of the model steam generator 1 will backflow into the feedwater destined for the nuclear steam generator. The motorized shutoff valve 606 allows the system operator to shut off the hydraulic feedwater system 600 from the feedwater source 602, should such a shutoff become desirable. Manual shutoff valve 608 is provided in the conduit 3 as a safety measure; it is not normally used unless the motorized shutoff valve 606 becomes inoperative for any reason.

At hydraulic "T" intersection 610, feedwater from the feedwater source 602 may be selectively allowed to flow into the previously mentioned cannisters 620 by opening the motorized flow valve 618 in conduit 612. Conduit 612 further includes a manual valve 616 which is normally open, but which may be closed should the system operator wish to isolate the feedwater flow from the cannisters 620 at a time when the motorized valve 618 is inoperative. A check valve 614 is also provided in conduit 610 in order to insure that there are no backflows from the water in the array of cannisters 620 into the feedwater inlet conduit 3. The array of cannisters 620 is hydraulically connected back up into the feedwater inlet conduit 3 by means of a conduit 622. Conduit 622, like conduit 610, includes a motorized shutoff valve 624, a manually controlled shutoff valve 626, and a check valve 628. Each of these valves serves the same function in conduit 622 that valves 618, 616 and 614 serve in conduit 612. Conduit 622 is hydraulically connected to the feedwater inlet conduit 3 at "T" intersection 630 as indicated. A further shutoff valve 632 is placed downstream of "T" intersection 630 and upstream of "T" intersection 610 in order to prevent a backflow of water coming out of the array of cannisters 620 into the feedwater source 602. The ability to isolate the flow of the water coming out of the cannisters from the feedwater source 602 is important, since this water will normally have a different chemistry than the feedwater flowing from the nuclear steam generator. Upstream of "T" intersection 630, feedwater inlet conduit 3 includes the previously discussed manual shutoff valve 5, and the motorized shutoff valve 7. The array of cannisters 620 provides a reservoir in which anti-corrosive or cleaning additives may be mixed with feedwater from the nuclear steam generator being monitored. As will become evident presently, the array of cannisters also provides a reservoir in which such additives may be mixed with demineralized, deaerated water from source 640.

In order to extend the testing options available in the model steam generator, and to provide a source of pure water for cleaning the secondary side 300 of the boiler assembly 100 between test runs, a source of demineralized, deaerated water 640 is hydraulically connected to the previously discussed array of cannisters 620. If anti-corrosive chemicals are already being mixed into the feedwater of the nuclear steam generator, the provision of demineralized, deaerated water source 640 allows the operator to test the efficacy of alternative anti-corrosive additives not in use in the steam generator. Source 640 is preferably the same source used for the makeup water system 60 connected to the primary side 102 of the boiler assembly 100. The source of demineralized, deaerated water 640 is hydraulically connected to the cannisters by way of water conduit 642, which in turn is connected to cannister conduit 645 at hydraulic "T" intersection 644. Cannister conduit 645 includes a check valve 646, a manual shutoff valve 647, and a motorized shutoff valve 648 which serve the same respective functions that the previously discussed valves 614, 616 and 618 serve with respect to conduit 612. The conduit 642, which is directly connected to the source of demineralized, deaerated water 640, continues on past hydraulic "T" intersection 644 and links up with the inlet conduit 62 of the makeup water supply 60 for the primary side 102 by way of check valves 650, manual shutoff valve 652 and motorized shutoff valve 654. Again, the respective functions of these valves are the same as those of the previously described valves 614, 616 and 618 of conduit 612.

The outlet side of the feedwater system 600 includes the previously discussed outlet conduits 426 and 476 from the condensate and blow-down sub-cooler coils 424 and 425, respectively. Each of these conduits further includes the previously discussed motorized shutoff valves 450, 494 as well as a manual shutoff valve 456, 500 for emergency use when either of the previously mentioned motorized shutoff valves 450, 494 becomes inoperative. These outlet conduits 426 and 476 are connected in parallel to a main outlet conduit 690 as shown. Conduit 690 is in turn connected to a holding tank 692. At its top portion, holding tank 692 is coupled to a source of pressurized nitrogen by way of pneumatic conduit 694. At its bottom portion, holding tank 692 is hydraulically connected to a drain by means of a drain conduit 695. The provision of a holding tank 692 with a nitrogen cover allows the water to be recirculated through the system if desired. Holding tank 692 also provides protection against the inadvertent dumping of radioactive water should the feedwater in the model steam generator become radioactively contaminated due to leaking heat exchange tubes in the nuclear steam generator.

Figure 3B:
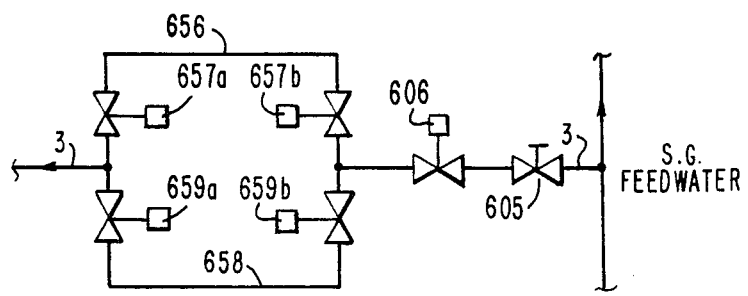
FIGS. 3B, 3C and 3D are all schematic views of alternative feedwater inlet systems of the invention.
Figure 3C:
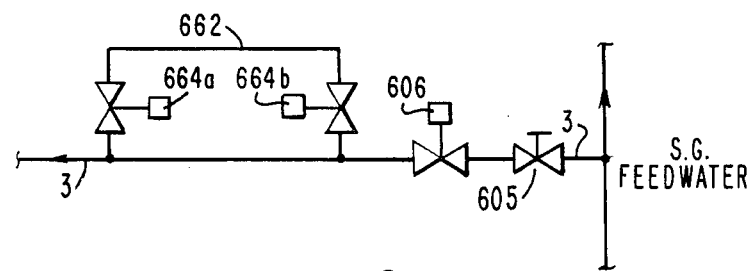
Figure 3D:
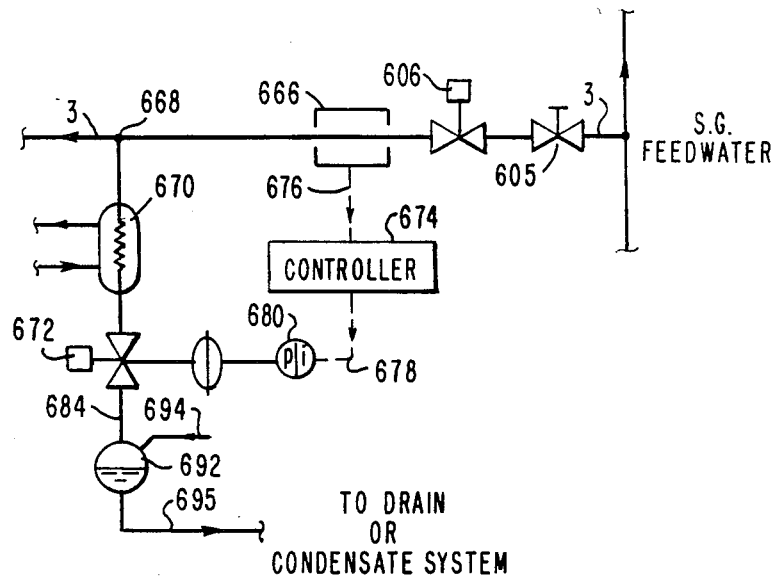

FIGS. 3B, 3C and 3D are alternative embodiments of the aforementioned means for maintaining a turbulent flow within the feedwater inlet conduit 3 in order that particulate solids in this feedwater will not be given an opportunity to settle before this water is introduced into the secondary side 300 of the boiler assembly 100.

FIG. 3B illustrates the preferred embodiment, in which a pair of pipes 656 and 658 are connected across a point in the inlet conduit 3 downstream of the motorized shutoff valve 606 and the manual shutoff valve 605. As indicated in the drawing, another manual and motorized shutoff valve 653, 655 precedes the pair of pipes 656 and 658. Pipe 656 preferably has an inner diameter of approximately 0.21 in.; while pipe 658 preferably has an inner diameter of approximately 0.313 in. Either, but not both, of the pipes 656 or 658 will be used during the operation of the model steam generator 1, depending upon the flow rate required to maintain particulate matter in the feedwater in a suspended state throughout the conduit 3. In order to allow the flow to be switched from the smaller diameter pipe 656 to the larger diameter pipe 658, each of the pipes 656 and 658 includes a pair of motorized shutoff valves 657a, 657b and 659a, 659b, respectively. The switch from the smaller diameter pipe 656 to the larger diameter pipe 658 might be made anywhere in the range of flow rate from 22 pounds per hour through 80 pounds per hour. The exclusive use of either the smaller diameter pipe 656 or the larger diameter pipe 658 maintains a high Reynolds number (in excess of 4,000) throughout a broad range of feedwater feed rates.

FIG. 3C discloses an alternative embodiment of the means for maintaining a high degree of anti-settling turbulence in the feedwater inlet conduit 3. In this particular arrangement, a single pipe 662 of equal inner diameter to the pipe forming the inlet conduit 3 is connected in parallel with the inlet conduit 3 as indicated. Parallel pipe 662 includes two motorized valves 664a, 664b in the positions shown. One or both of the pipes 3 and 662 may be used, depending upon the required flow rate. In the preferred embodiment, each of the pipes 3 and 662 has an inner diameter of approximately 0.214 in. The switch from the use of a single pipe to both pipes might be made anywhere in the flow rate range from 24 pounds per hour through 80 pounds per hour.

FIG. 3D discloses still another embodiment of the required turbulence-maintaining means of the feedwater inlet and outlet system 600. Here, a single tube 604 is provided which carries a constant flow of feedwater to the secondary side 302 which is well in excess of the amount needed to maintain a sufficiently turbulent flow in the inlet conduit 3, in order that particulate matter in the feedwater will not settle in the conduit 3. Since this flow rate is also well in excess of the usual feed requirements of the model steam generator 1, some means must be provided to drain the excess. Such a means is provided in the form of pneumatically controlled valve 672. This valve is disposed in a conduit 684 which intersects the inlet conduit 3 at "T" intersection 668.

A flowmeter 666 connected to the central processing unit 21 modulates the pneumatically-controlled valve 672 through a current-to-pressure transducer 680, which is electrically connected to an output module 674 of the central processing unit 21. When the flowmeter 666 senses that the demand for feedwater in the primary side 300 of the boiler assembly 100 is high, it will close the pneumatically-operated valve 672 so that a relatively small amount of feedwater is drained off at "T" intersection 668 through conduit 684 into the previously discussed holding tank 692. If, on the other hand, flowmeter 666 perceives that the demand for feedwater in the secondary side 300 is low, it will open the pneumatically-controlled valve 672 by the amount necessary to drain off all the excess feedwater at "T" intersection 668 and through conduit 684. In closing, it should be noted that the conduit 684 leading to the holding tank 692 includes a cooling coil 670 for lowering the temperature of the feedwater in order to insure that no flashing conditions occur anywhere in the conduit 684 en route to the holding tank 692.

From the aforementioned description, it can now be seen that the feedwater inlet and outlet system 600 provides three distinct options to the operator of the model steam generator. First, the operator may let feedwater directly from the nuclear steam generator being monitored directly into the secondary side 300 of the boiler assembly 100. Second, the operator may drain a selected amount of this feedwater into the array of cannisters 620, add anti-corrosive or cleaning chemicals to this feedwater for comparative testing purposes, and then pump this treated feedwater into the primary side 300 of the boiler assembly 100 by means of a pump (not shown) through conduit 622. Third, if anti-corrosive or cleaning additives are already in use in the feedwater of the steam generator, the operator may fill the cannisters 620 with demineralized, deaerated water from source 640 and test the efficacy of alternative anti-corrosive additives, or introduce this water into the secondary side 300 of the boiler assembly 100 for cleaning purposes.

Figure 4:
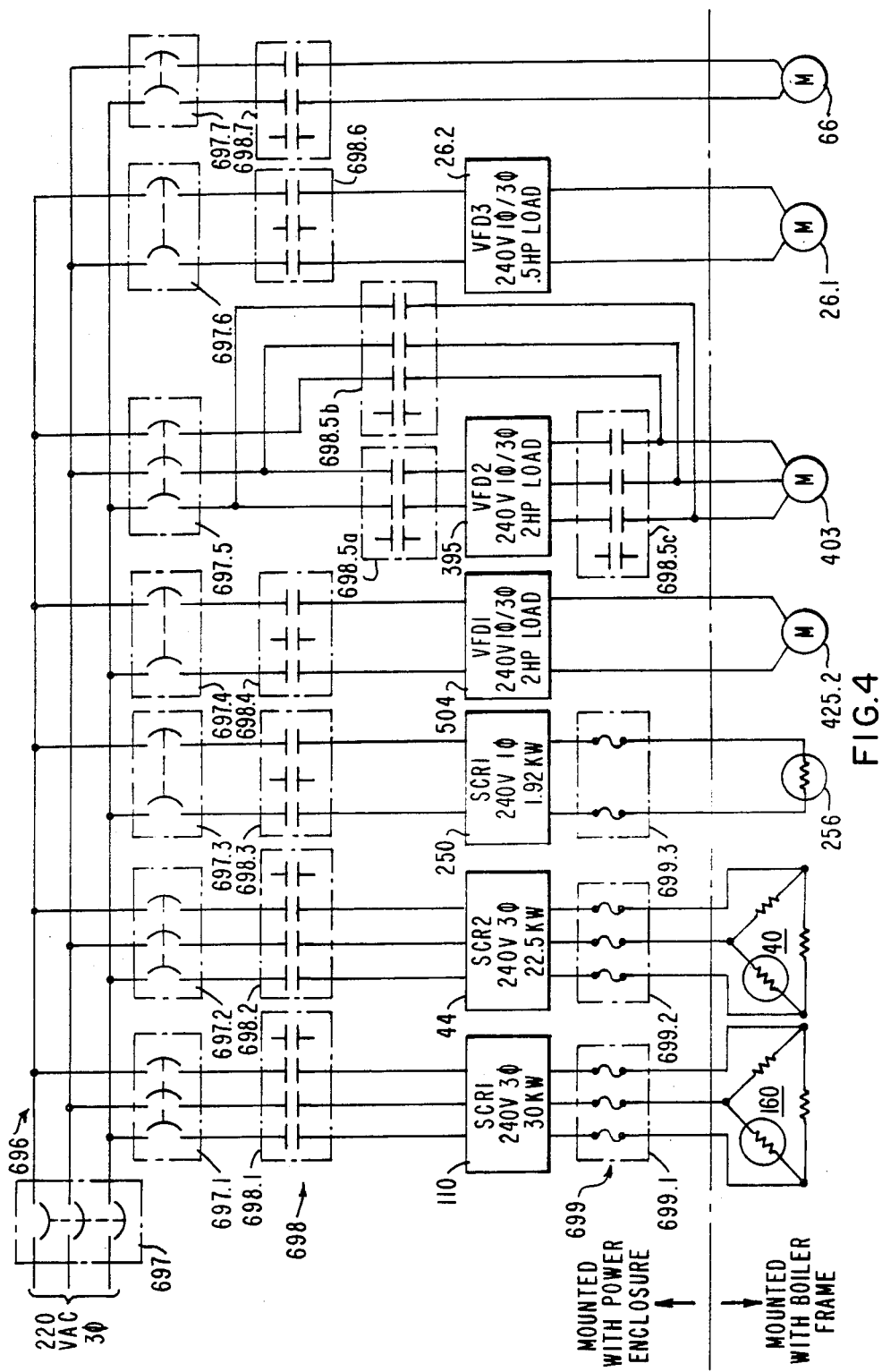
FIG. 4 is a schematic diagram of the electric power circuits of the model steam generator.

Turning now to FIG. 4, the power circuit 696 of the model steam generator 1 includes a main circuit breaker 697 for simultaneously disconnecting the power to the heating elements 40, 160 and 256 of the feedwater preheater 31, the primary side heater assembly 150, and the tubesheet guart heater 244, as well as the condenser assembly and sub-cooler blowers 403 and 425.2 in the event of a current overload. Main circuit breaker 697 will also simultaneously cut off the positive displacement pump 66 of the makeup water system 60, and the feedwater booster pump 26.1 in the event a current overload condition arises. As is indicated in the schematic, each of these components is connected in parallel with the main power cable of the system through its respective circuit breaker 697.1, 697.2, 697.3, 697.4, 697.5, 697.6 and 697.7. Additionally, a plurality of contacter assemblies 698 is serially connected to each of the aforementioned circuit breakers 697.1 through 697.7 so that power may be selectively switched to the feedwater pre-heater 31, the primary side heating assembly 150, the tubesheet guart heater 244, the condenser assembly and sub-cooler blowers 403 and 425.2, and the pumps 26.1 and 66. Specifically, the heating elements 160 of the heater assembly 150 are serially connected to the main power line through contacter assembly 698.1, while the heating elements 40 and 256 of the feedwater pre-heater and tubesheet heater 244 are serially connected to this main power cable via contacter assemblies 698.2 and 698.3, respectively. Likewise, the sub-cooler blower 425.2, the feedwater booster pump 26.1, and makeup water pump 66 are serially connected to this main power cable by way of contacter assemblies 698.4, 698.6 and 698.7. A notable exception to this serial arrangement of the contacter assemblies occurs with respect to the condenser assembly blower 403. This particular blower 403 is connected to the main power cable both serially, by way of contacter assembly 698.5a, as well as in parallel, by way of the parallel circuit including contacter assemblies 698.5b and 698.5c. Because the condenser blower 403 serves the critical function of controlling the pressure within the secondary side 300 of the boiler assembly 100, the provision of a parallel circuit insures that the motor of the condenser assembly blower 403 will be able to receive power from the main power line even if there is a complete breakdown of the variable-speed controller 395 which generally regulates the amount of power blower 403 receives from the main power line. As an added precaution against a power surge occurring in the heater circuits of the primary side heater assembly 150, the feedwater pre-heater 31, or the tubesheet heater 244, fuse assemblies 699.1, 699.2 and 699.3 are serially connected between the heating elements 160, 40 and 256 of these components, and the main power cable.

With reference now to FIGS. 5A, 5B and 5C, the mechanical configuration of the model steam generator 1 includes a main frame 702 wherein the preheater, boiler assembly 100, condenser 400, and sub-cooler assembly 423 are all mounted. The main frame 702 includes a pair of suspension braces 704a, 704b for suspending the secondary side 300 of the boiler assembly 100. The secondary side 300 includes a pair of opposing suspension flanges 706a, 706b which extend out from the sides of the secondary side 300 as illustrated. These suspension flanges 706a, 707b are in turn mounted onto the suspension braces 704a, 704b by means of bolts 708a, 708b. The balance of the boiler assembly 100 is mounted on a cart 720 which is capable of moving both the primary side 102 and the tubesheet 240 laterally and vertically. As will be described in more detail hereinafter, the provision of such a laterally and vertically movable cart, in combination with the Grayloc ®-type clamp assemblies 215 and 280, greatly facilitates access to the sample tubes 258a, 258b, 258c and 258d at the termination of any tube-corrosion test which the model steam generator 1 might perform. This is an important feature of the invention, as certain types of corrosion tests require relatively frequent access to the sample heat exchange tubes 258a, 258b, 258c and 258d.

In order to provide proper alignment between the secondary side 300 and the tubesheet 240 and primary side 102 mounted on the cart 720, the main frame 702 includes four threaded rods 715a, 715b, 715c and 715d which are mounted parallel to the columns of the frame 702 by means of mounting brackets 717a, 717b, 717c and 717d. The upper frame 722 of the cart 720 includes four cylindrical sleeves 724a, 724b, 724c and 724d, respectively, in its corners. These sleeves are registrable with the threaded rods 715a, 715b, 715c and 715d. When the cart 720 is rolled into the main frame 702, and the primary side 102 and the tubesheet 240 are positioned beneath the bottom of the secondary side 300, the cart 720 includes a jack 730 which may be used to raise the tubesheet 240 and primary side 102 against the bottom of the secondary side 300. If the cylinders 724a, 724b, 724c and 724d receive the threaded rods 715a, 715b, 715c and 715d while the jack raises the tubesheet 240 and primary side 102 into engagement with the secondary side, the tubesheet 240 and secondary side 300 will become properly aligned. Thereafter, bolts (not shown) may be screwed onto the ends of the threaded rods 715a, 715b, 715c and 715d in order to secure the tubesheet 240 and the secondary side 300 into a properly aligned position. Preferably, a spring-biasing means (not shown) formed from either coil springs or stacks of Bellville-type washers is placed over the end of the threaded rod before its respective nut is screwed on in order to resiliently bias the upper flange 276 of the tubesheet 240 against the lower flange 284 of the secondary side 300, while affording some degree of "play" between these flanges which facilitates the proper mounting of the clamping assembly 280.

FIGS. 6A, 6B, 6C and 6D illustrate the cart 720 used to laterally and vertically move the primary side 102 and tubesheet 240 to and from the secondary side 300 which is suspended within the main frame 702 of the model steam generator 1. Specifically, the cart 720 includes an upper frame 722 onto which the primary side 102 is mounted by means of a pair of parallel suspension braces 723a, 723b. As was the case with the suspension braces 704a, 704b of the secondary side 300, the suspension braces 723a, 723b of the primary side 102 are bolt-mounted onto a pair of opposing mounting flanges 725a, 725b which extend out of the body 184 of the primary side 102. Both the suspension braces 723a, 723b and the manner in which they mount the primary side 102 onto the cart frame 722, are best seen with reference to FIGS. 6A and 6C.

Figure 6A:
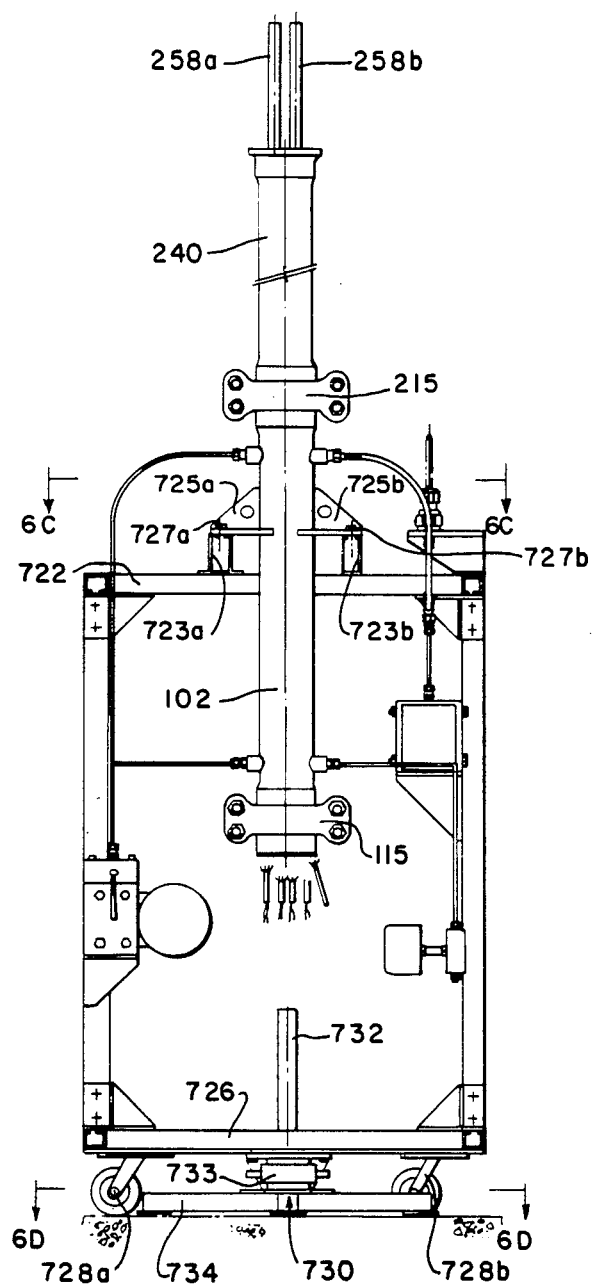
FIG. 6A is a front view of the cart used to transport the primary side and tubesheet of the boiler assembly to and from the main frame of the model steam generator.
Figure 6B:
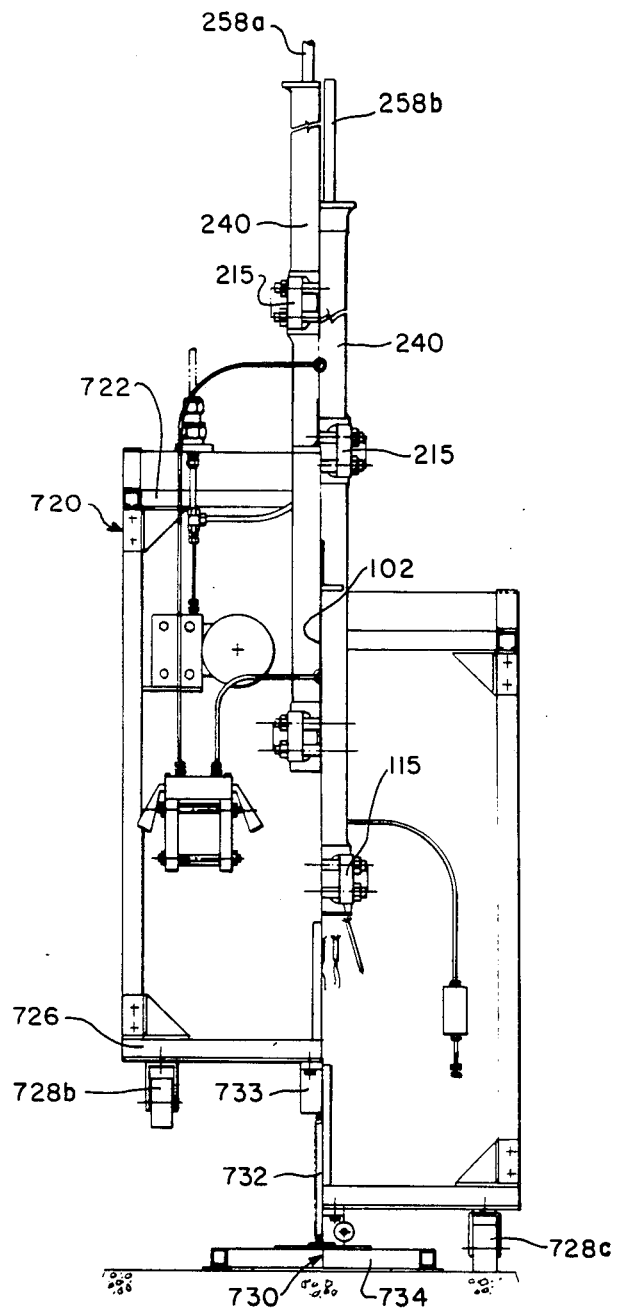
FIG. 6B is a broken, side view of the cart shown in FIG. 6A, illustrating how the jack mounted on the bottom of the cart may be used to vertically position the primary side and tubesheet of the boiler assembly of the invention.
Figure 6C:
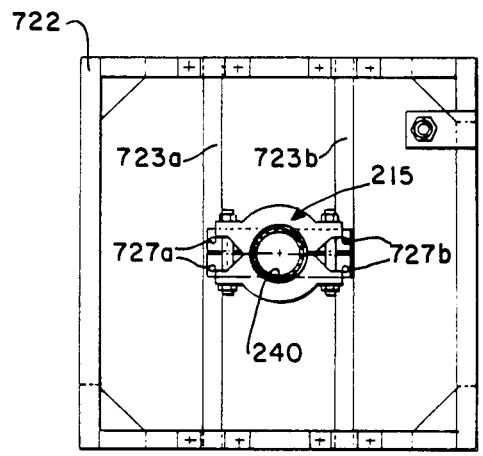
FIG. 6C is a top, plan view of the cart taken along line 6C—6C of FIG. 6A.
Figure 6D:
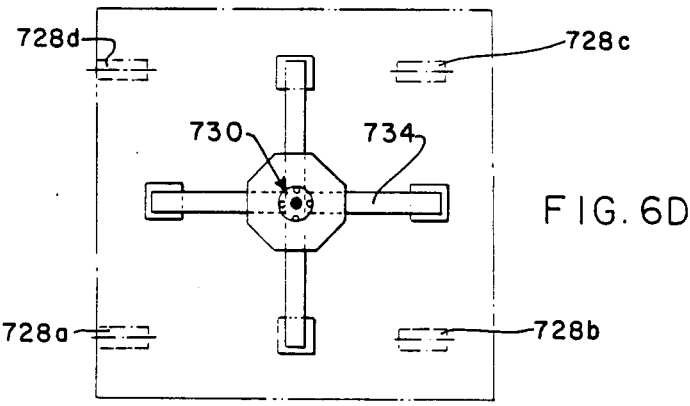
FIG. 6D is a top, plan view of the stand of the jack used to vertically adjust the position of the cart taken along line 6D—6D of FIG. 6A.

Turning now to the lower frame 726 of the cart 720, this frame includes four caster assemblies 728a, 728b, 728c and 728d, respectively, at each corner of the frame 726. As may best be seen with reference to FIGS. 6A and 6D, the lower frame 726 includes the previously mentioned screw jack 730, which is formed from a threaded screw rod 732 onto which a jack collar 733 is threadedly engaged. The screw rod 732 is fixedly mounted within a jack pad 734 as indicated. As is shown in FIG. 6B, when the threaded jack collar 733 is rotated counterclockwise, the screw jack 730 vertically lifts the cart 720 and the primary side 102 and tubesheet 240 of the boiler assembly 100.

In operation, when it is desired to open the boiler assembly 100 and inspect the sample tubes 258a, 258b, 258c and 258d within the tubesheet 240, the operator first unclamps the Grayloc ®-type clamping assembly 280 which detachably connects the upper end of the tubesheet 240 to the lower end of the secondary side 300. Next, in order to withdraw the sample tubes 258a, 258b, 258c and 258d from the secondary side, as well as to place the primary side 102 and tubesheet 240 of the boiler assembly 100 in a position so that they may be moved laterally relative to the secondary side 300, the nuts (not shown) which are threadedly engaged to the threaded alignment rods 715a, 715b, 715c and 715d are removed. The collar 733 of the screw jack 730 is then twisted counterclockwise until the casters 728a, 728b, 728c and 728d of the cart 720 are placed in contact with the ground. Of course, all of the various pneumatic and hydraulic lines for the makeup water and the level sensors are disconnected by unscrewing their respective fittings. Once this is accomplished, the primary side 102 and the tubesheet 240 may be rolled out from under the secondary side 300 and out from under main frame 702, and placed into any desired location. To reassemble the boiler assembly 100, each of the steps of the previously described disassembling process is reversed.

What is claimed is:

1. An improved model steam generator for simulating the conditions inside a full-scale steam generator in order to monitor the conditions of the heat exchange tubes and tubesheet contained within the full-scale generator, comprising a boiler vessel having a feedwater inlet for introducing feedwater to the interior of the vessel, at least one sample heat exchange tube for converting the feedwater into a flow of steam, a steam outlet for conducting the flow of steam out of the vessel, and a separator assembly for separating water droplets entrained within the steam flowing out of the outlet to an extent greater than the amount of droplet separation achieved within the full-scale generator being monitored so that the model steam generator can be operated in a predictive mode, wherein said separator includes a plurality of stationary separator grids, each of which is formed from an array of deflector members.

2. The improved model steam generator of claim 1, wherein the deflector members of each grid are mutually parallel.

3. The improved model steam generator of claim 1, wherein the plurality of grids includes first and second grid stacks, and wherein each of the grids in the first stack includes more deflector members than each of the grids in the second stack.

4. The improved model steam generator of claim 1, wherein each of the deflector members is transversely disposed across the flow of steam.

5. The improved model steam generator of claim 4, wherein at least one of the deflector members is inclined at an angle relative to the horizontal so that water droplets impinging upon these deflector members will drain back down into the interior of the boiler vessel.

6. The improved model steam generator of claim 1, further including a pre-heater means for heating the feedwater to a selected temperature before introducing the feedwater into the boiler vessel, in order to simulate the conditions around a selected region of the tubesheet of the full-scale steam generator.

7. The improved model steam generator of claim 6, wherein the pre-heater includes at least one double-walled, electrical cartridge type heater.

8. The improved model steam generator of claim 1, wherein each deflector member is an elongated, semi-cylindrical member transversely disposed across the flow of steam, with its concave side substantially facing the flow of steam.

9. The improved model steam generator of claim 8, wherein the deflector members of each grid are substantially parallel to one another.

10. The improved model steam generator of claim 9, wherein the deflector members of each grid are angularly disposed relative to the deflector members of the adjacent grids in order to provide a tortuous path for the steam flowing through the grids.

11. An improved model steam generator for simulating the conditions inside a nuclear steam generator in order to monitor the conditions of the heat exchange tubes and tubesheet contained within the nuclear steam generator, comprising a boiler vessel having a feedwater inlet for introducing feedwater to the interior of the vessel, at least one sample heat exchange tube for converting the feedwater into a flow of steam, a steam outlet for conducting the flow of steam out of the vessel, a separator assembly for separating water droplets entrained within the steam flowing out of the outlet, including a plurality of separator grids for capturing the entrained water droplets and draining the droplets back into the boiler vessel, and a condenser assembly having first and second sets of condenser windings for converting the flow of steam produced by the boiler vessel into liquid condensate, wherein the condenser assembly includes a means for selectively fluidly disconnecting one of the sets of condenser windings in order to increase the turn-down ratio of the model steam generator.

12. The improved model steam generator of claim 11, wherein at least one of the deflector members is inclined at an angle relative to the horizontal, so that water droplets impinging the deflector member will drain down the walls of boiler vessel.

13. The improved model steam generator of claim 11, wherein said means for selectively fluidly disconnecting one of the sets of condenser windings includes a banking valve.

14. The improved model steam generator of claim 11, wherein each of the separator grids is formed from an array of mutually parallel deflector members which are transversely disposed to the flow of steam in the vessel, and wherein each of the deflector members is an elongated, semi-cylindrical member whose concave side faces the flow of steam.

15. The improved model steam generator of claim 14, wherein the deflector members of each grid are angularly disposed to the deflector members of adjacent grids in order to provide a tortuous path for the steam flowing to the grids.

16. The improved model steam generator of claim 11, further including a pre-heater means for heating the feedwater to a selected temperature before introducing it into the boiler vessel, in order to simulate the conditions around a selected region of the tubesheet of the full-scale steam generator.

17. The improved model steam generator of claim 16, wherein the pre-heater includes at least one double-walled cartridge heater.

18. The improved model steam generator of claim 11, wherein the plurality of separator grids includes first and second stacks of grids, and wherein each of the grids of the first stack includes a fewer number of deflector members than each of the grids in the second stack.

19. The improved model steam generator of claim 18, wherein each of the deflector members in each of the grids of the first stack are inclined to the horizontal in order that water droplets impinging upon the deflector members of said grids will drain back down into the feedwater located at the bottom of the boiler vessel of the model steam generator.

20. An improved model steam generator for simulating the conditions inside a nuclear steam generator in order to monitor the conditions of the heat exchange tubes and tubesheet contained within the nuclear generator, comprising a boiler vessel having a feedwater inlet for introducing feedwater to the interior of the vessel, at least one sample heat exchange tube for converting the feedwater into a flow of steam, a blow-down means for blowing down the vessel interior, a steam outlet for conducting the flow of steam out of the vessel, and a separator assembly for separating water droplets entrained within the steam flowing out of the outlet, including a plurality of separator grids, each of which is formed from a parallel array of semi-cylindrical deflector members having their concave sides facing the flow of steam, a condenser assembly having first and second sets of condenser windings for converting the flow of steam into a liquid condensate, and further including a means for selectively fluidly disconnecting one of the sets of condenser windings in order to increase the turn-down ratio of the steam generator, and a preheater for heating the feedwater to a selected temperature before introducing the feedwater into the boiler vessel in order to simulate the conditions around a selected region of the tubesheet of the nuclear steam generator.

21. The improved model steam generator of claim 20, wherein the separator assembly removes at least the same percentage of the water droplets entrained in the flow of steam exiting the model boiler vessel as the separator of the nuclear steam generator removes from the flow of steam which it generates.

22. An improved model steam generator for simulating the conditions inside a full-scale steam generator in order to monitor the conditions of the heat exchange tubes and tubesheet contained within the full-scale generator, comprising a boiler vessel having a feedwater inlet for introducing feedwater to the interior of the vessel, at least one sample heat exchange tube for converting the feedwater into a flow of steam, a steam outlet for conducting the flow of steam out of the vessel, and a separator assembly for separating water droplets entrained within the steam flowing out of the outlet including a plurality of separator grids, each of which is formed from an array of deflector members, and a condenser assembly having first and second sets of condenser windings for converting the flow of steam into a liquid condensate, wherein the condenser assembly includes a means for selectively fluidly disconnecting one of the sets of condenser windings in order to increase the turn-down ratio of the model steam generator.

23. An improved model steam generator for simulating the conditions inside a full-scale steam generator in order to monitor the conditions of the heat exchange tubes and tubesheet contained within the full-scale generator, comprising a boiler vessel having a feedwater inlet for introducing feedwater to the interior of the vessel, at least one sample heat exchange tube for converting the feedwater into a flow of steam, a steam outlet for conducting the flow of steam out of the vessel, and a means for separating water droplets entrained within the steam flowing out of the outlet to an extent at least as great as the amount of droplet separation achieved within the fullscale generator being monitored so that the model steam generator can be operated in a predictive mode, wherein said separating means consists solely of a separator assembly having a plurality of separator grids, each of which is formed from an array of deflector members.

24. An improved model steam generator for simulating the conditions inside a full-scale steam generator in order to monitor the conditions of the heat exchange tubes and tubesheet contained within the full-scale generator, comprising a boiler vessel having a feedwater inlet for introducing feedwater to the interior of the vessel, at least one heat exchange tube for converting the feedwater into a flow of steam, a steam outlet for conducting the flow of steam out of the vessel, and a condenser assembly having first and second sets of condenser windings for converting the flow of steam into a liquid condensate, wherein the condenser assembly includes a means for selectively fluidly disconnecting one of the sets of condenser windings in order to increase the turn-down ratio of the model steam generator.

* * * * *